US011714267B2

(12) United States Patent
Chen et al.

(10) Patent No.: US 11,714,267 B2
(45) Date of Patent: Aug. 1, 2023

(54) OPTICAL IMAGING LENS MODULE

(71) Applicant: Genius Electronic Optical (Xiamen) Co., Ltd., Fujian (CN)

(72) Inventors: Wensen Chen, Fujian (CN); Ziping Li, Fujian (CN)

(73) Assignee: Genius Electronic Optical (Xiamen) Co., Ltd., Xiamen (CN)

(*) Notice: Subject to any disclaimer, the term of this patent is extended or adjusted under 35 U.S.C. 154(b) by 520 days.

(21) Appl. No.: 16/849,672

(22) Filed: Apr. 15, 2020

(65) Prior Publication Data
US 2021/0199934 A1 Jul. 1, 2021

(30) Foreign Application Priority Data
Dec. 31, 2019 (CN) .......................... 201911408115.3

(51) Int. Cl.
*G02B 7/02* (2021.01)
*G02B 13/18* (2006.01)
*G02B 9/62* (2006.01)

(52) U.S. Cl.
CPC .............. *G02B 13/18* (2013.01); *G02B 7/021* (2013.01); *G02B 9/62* (2013.01)

(58) Field of Classification Search
CPC .......... G02B 13/18; G02B 7/021; G02B 9/62; G02B 3/04; G02B 13/0045; G02B 13/001; G02B 7/02; G02B 27/09; G03B 5/06
See application file for complete search history.

(56) References Cited

U.S. PATENT DOCUMENTS

| 7,151,640 | B2 * | 12/2006 | Sawagami | B29D 11/00009 264/1.33 |
|---|---|---|---|---|
| 9,069,119 | B2 * | 6/2015 | Takase | G02B 7/021 |
| 9,341,813 | B1 * | 5/2016 | Lin | G02B 7/021 |
| 9,746,634 | B2 * | 8/2017 | Wei | G02B 7/021 |
| 9,746,635 | B2 * | 8/2017 | Wei | G02B 7/003 |
| 2005/0190460 | A1 * | 9/2005 | Sawagami | G11B 7/1372 359/811 |
| 2015/0241656 | A1 * | 8/2015 | Choi | G02B 7/021 359/819 |
| 2016/0139359 | A1 * | 5/2016 | Lin | G02B 5/005 359/793 |
| 2018/0045918 | A1 * | 2/2018 | Seo | G02B 13/0045 |
| 2019/0025600 | A1 * | 1/2019 | Tang | G02B 13/0045 |
| 2019/0064399 | A1 * | 2/2019 | Wang | H04N 23/55 |
| 2021/0018715 | A1 * | 1/2021 | Fujii | G02B 13/18 |
| 2021/0088752 | A1 * | 3/2021 | Tang | G03B 17/12 |

* cited by examiner

*Primary Examiner* — Balram T Parbadia
(74) *Attorney, Agent, or Firm* — Chen Yoshimura LLP

(57) ABSTRACT

An optical imaging lens module is provided. The optical imaging lens module may include a lens barrel and an optical imaging lens. The optical imaging lens may include a plurality of lens elements engaged with the lens barrel in an order from an object side to an image side along an optical axis. A first lens element is the lens element closest to the object side in the plurality of lens elements. The first lens element may include an optical effective portion and an optical ineffective portion surrounding the optical effective portion. The optical effective portion may include an object-side surface facing toward the object side and allowing imaging rays to pass through as well as an image-side surface facing toward the image side and allowing the imaging rays to pass through. A border around the object-side surface may have an extension surface extending from the object side toward the image side.

18 Claims, 20 Drawing Sheets

| Embodiment 7 ||||||||
| :---: | :---: | :---: | :---: | :---: | :---: | :---: | :---: |
| EFL = 4.045 mm ; HFOV = 40.051 degrees ; TTL = 5.030 mm ||||||||
| Fno = 2.373 ; Image Height = 3.323 mm ||||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.163 | | | | |
| L1A1 | 1st lens element | 1.890 | 0.980 | 1.545 | 55.987 | 2.885 | Plastic |
| L1A2 | | -7.739 | 0.035 | | | | |
| L2A1 | 2nd lens element | 15.361 | 0.220 | 1.661 | 20.373 | -5.965 | Plastic |
| L2A2 | | 3.142 | 0.382 | | | | |
| L3A1 | 3rd lens element | -7.437 | 0.260 | 1.545 | 55.987 | -17.927 | Plastic |
| L3A2 | | -31.302 | 0.059 | | | | |
| L4A1 | 4th lens element | 5.120 | 0.313 | 1.640 | 23.529 | -38.955 | Plastic |
| L4A2 | | 4.151 | 0.303 | | | | |
| L5A1 | 5th lens element | 4.277 | 0.942 | 1.545 | 55.987 | 1.630 | Plastic |
| L5A2 | | -1.037 | 0.161 | | | | |
| L6A1 | 6th lens element | -2.418 | 0.248 | 1.545 | 55.987 | -1.357 | Plastic |
| L6A2 | | 1.107 | 0.700 | | | | |
| TFA1 | Filtering unit | INFINITY | 0.210 | 1.517 | 64.167 | | |
| TFA2 | | INFINITY | 0.217 | | | | |
| IMA | Image plane | INFINITY | | | | | |

FIG. 14

| Embodiment 7 | | | |
|---|---|---|---|
| Aspherical Parameters | | | |
| Surface # | K | a2 | a4 | a6 |
| L1A1 | 0.000000E+00 | 0.000000E+00 | -1.358080E-02 | -1.061282E-02 |
| L1A2 | 0.000000E+00 | 0.000000E+00 | -6.713642E-02 | 1.432595E-01 |
| L2A1 | 0.000000E+00 | 0.000000E+00 | -2.709321E-02 | 1.738012E-01 |
| L2A2 | 7.225327E+00 | 0.000000E+00 | -2.210756E-02 | 9.723223E-02 |
| L3A1 | 0.000000E+00 | 0.000000E+00 | -7.849930E-02 | -9.841562E-03 |
| L3A2 | 0.000000E+00 | 0.000000E+00 | -1.097842E-01 | 6.199753E-02 |
| L4A1 | 0.000000E+00 | 0.000000E+00 | -2.097578E-01 | 2.942382E-01 |
| L4A2 | 0.000000E+00 | 0.000000E+00 | -2.480003E-01 | 2.262300E-01 |
| L5A1 | 0.000000E+00 | 0.000000E+00 | -1.235049E-01 | 4.056010E-02 |
| L5A2 | -6.596357E+00 | 0.000000E+00 | -6.432347E-02 | 1.428089E-02 |
| L6A1 | 0.000000E+00 | 0.000000E+00 | -9.327865E-02 | 3.769080E-02 |
| L6A2 | -1.048761E+01 | 0.000000E+00 | -1.148961E-01 | 8.507713E-02 |
| Surface # | a8 | a10 | a12 | a14 |
| L1A1 | -8.396881E-03 | -6.040142E-03 | 1.401252E-02 | -1.881060E-02 |
| L1A2 | -4.523338E-01 | 5.715408E-01 | -2.411390E-01 | -9.640275E-02 |
| L2A1 | -3.941513E-01 | 3.108701E-01 | 2.105189E-01 | -4.118241E-01 |
| L2A2 | -2.036192E-01 | 1.742070E-01 | -4.461955E-02 | 1.546446E-02 |
| L3A1 | 1.413855E-03 | -3.867762E-01 | 1.107129E+00 | -1.349869E+00 |
| L3A2 | 2.139194E-02 | -5.436602E-01 | 9.142423E-01 | -6.517236E-01 |
| L4A1 | -3.569680E-01 | 2.010449E-01 | -7.411163E-02 | 3.863266E-02 |
| L4A2 | -1.300485E-01 | -7.759613E-03 | 4.689648E-02 | -1.940071E-02 |
| L5A1 | -2.850903E-03 | -8.548020E-03 | 1.864257E-03 | 7.524772E-04 |
| L5A2 | 1.054369E-02 | -4.073370E-03 | 4.624637E-04 | -7.181132E-05 |
| L6A1 | 1.114734E-02 | -8.136544E-03 | 1.681447E-03 | -1.214456E-04 |
| L6A2 | -4.927637E-02 | 1.997197E-02 | -5.515781E-03 | 1.000819E-03 |
| Surface # | a16 | a18 | a20 | |
| L1A1 | 5.349889E-03 | | | |
| L1A2 | 7.621910E-02 | | | |
| L2A1 | 1.476709E-01 | | | |
| L2A2 | -1.845984E-02 | | | |
| L3A1 | 6.283272E-01 | | | |
| L3A2 | 1.849087E-01 | | | |
| L4A1 | -1.304304E-02 | | | |
| L4A2 | 2.422096E-03 | | | |
| L5A1 | 7.695114E-05 | -2.810500E-04 | 5.997279E-05 | |
| L5A2 | -8.454713E-05 | 4.771105E-05 | -6.270057E-06 | |
| L6A1 | -1.160395E-06 | -1.154909E-07 | 6.988790E-08 | |
| L6A2 | -1.145530E-04 | 7.572201E-06 | -2.216672E-07 | |

FIG. 15

| Embodiment 8 | | | | | | | |
|---|---|---|---|---|---|---|---|
| EFL = 3.852 mm ; HFOV = 40.051 degrees ; TTL = 4.956 mm | | | | | | | |
| Fno = 2.219 ; Image Height = 3.323 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.184 | | | | |
| L1A1 | 1st lens element | 1.902 | 1.230 | 1.545 | 55.987 | 2.814 | Plastic |
| L1A2 | | -6.186 | 0.035 | | | | |
| L2A1 | 2nd lens element | -23.011 | 0.220 | 1.661 | 20.373 | -5.904 | Plastic |
| L2A2 | | 4.770 | 0.250 | | | | |
| L3A1 | 3rd lens element | -40.990 | 0.260 | 1.545 | 55.987 | -13.739 | Plastic |
| L3A2 | | 9.208 | 0.048 | | | | |
| L4A1 | 4th lens element | 13.641 | 0.614 | 1.640 | 23.529 | -23.130 | Plastic |
| L4A2 | | 6.998 | 0.139 | | | | |
| L5A1 | 5th lens element | 3.243 | 0.525 | 1.545 | 55.987 | 1.651 | Plastic |
| L5A2 | | -1.178 | 0.168 | | | | |
| L6A1 | 6th lens element | -2.419 | 0.339 | 1.545 | 55.987 | -1.502 | Plastic |
| L6A2 | | 1.303 | 0.700 | | | | |
| TFA1 | Filtering unit | INFINITY | 0.210 | 1.517 | 64.167 | | |
| TFA2 | | INFINITY | 0.217 | | | | |
| IMA | Image plane | INFINITY | | | | | |

FIG. 18

| Embodiment 8 | | | | |
|---|---|---|---|---|
| Aspherical Parameters | | | | |
| Surface # | K | a2 | a4 | a6 |
| L1A1 | 0.000000E+00 | 0.000000E+00 | -1.679392E-02 | 3.625681E-02 |
| L1A2 | 0.000000E+00 | 0.000000E+00 | -9.838847E-02 | 1.069691E-01 |
| L2A1 | 0.000000E+00 | 0.000000E+00 | -5.643067E-02 | 1.337363E-01 |
| L2A2 | 1.977319E+01 | 0.000000E+00 | -2.946168E-03 | 3.860648E-02 |
| L3A1 | 0.000000E+00 | 0.000000E+00 | -6.725123E-02 | -1.558795E-01 |
| L3A2 | 0.000000E+00 | 0.000000E+00 | -1.347232E-01 | 1.461692E-02 |
| L4A1 | 0.000000E+00 | 0.000000E+00 | -1.254027E-01 | 2.755346E-01 |
| L4A2 | 0.000000E+00 | 0.000000E+00 | -2.116556E-01 | 2.126734E-01 |
| L5A1 | 0.000000E+00 | 0.000000E+00 | -1.259163E-01 | 9.072514E-03 |
| L5A2 | -8.045806E+00 | 0.000000E+00 | -7.311989E-03 | -8.774510E-03 |
| L6A1 | 0.000000E+00 | 0.000000E+00 | -5.629820E-02 | 3.261975E-02 |
| L6A2 | -1.121438E+01 | 0.000000E+00 | -9.537227E-02 | 7.568063E-02 |
| Surface # | a8 | a10 | a12 | a14 |
| L1A1 | -1.392506E-01 | 1.655848E-01 | 5.021679E-03 | -1.736187E-01 |
| L1A2 | -3.603700E-01 | 5.484239E-01 | -2.314622E-01 | -8.946616E-02 |
| L2A1 | -4.452523E-01 | 5.214343E-01 | 5.696886E-02 | -3.463083E-01 |
| L2A2 | -1.823423E-01 | 1.916319E-01 | -9.313647E-02 | 7.509006E-03 |
| L3A1 | 3.054499E-01 | -2.430188E-01 | 1.653823E-01 | -3.904286E-01 |
| L3A2 | -4.629289E-02 | -3.409806E-01 | 6.962073E-01 | -4.854462E-01 |
| L4A1 | -5.227284E-01 | 2.921931E-01 | -1.102276E-02 | 1.579162E-02 |
| L4A2 | -1.069888E-01 | -2.619141E-02 | 3.949425E-02 | -1.014991E-02 |
| L5A1 | 2.215195E-02 | -1.569483E-02 | -6.200503E-03 | 1.451087E-03 |
| L5A2 | 8.204652E-03 | -9.960404E-04 | 1.751618E-04 | -1.437483E-04 |
| L6A1 | 9.064996E-03 | -6.910804E-03 | 1.391437E-03 | -9.417489E-05 |
| L6A2 | -4.394786E-02 | 1.704607E-02 | -4.512439E-03 | 7.892435E-04 |
| Surface # | a16 | a18 | a20 | |
| L1A1 | 1.005622E-01 | | | |
| L1A2 | 6.718564E-02 | | | |
| L2A1 | 1.305513E-01 | | | |
| L2A2 | 9.567711E-03 | | | |
| L3A1 | 2.912582E-01 | | | |
| L3A2 | 1.329606E-01 | | | |
| L4A1 | -2.799898E-02 | | | |
| L4A2 | 5.100085E-04 | | | |
| L5A1 | 1.634950E-03 | -5.083912E-06 | -1.382355E-04 | |
| L5A2 | -6.110788E-05 | 3.861698E-05 | -4.644260E-06 | |
| L6A1 | -9.899356E-07 | -1.415572E-07 | 5.420648E-08 | |
| L6A2 | -8.714021E-05 | 5.595075E-06 | -1.625378E-07 | |

FIG. 19

| Embodiment | 7th | 8th |
|---|---|---|
| T1 | 0.980 | 1.230 |
| G12 | 0.035 | 0.035 |
| T2 | 0.220 | 0.220 |
| G23 | 0.382 | 0.250 |
| T3 | 0.260 | 0.260 |
| G34 | 0.059 | 0.048 |
| T4 | 0.313 | 0.614 |
| G45 | 0.303 | 0.139 |
| T5 | 0.942 | 0.525 |
| G56 | 0.161 | 0.168 |
| T6 | 0.248 | 0.339 |
| G6F | 0.700 | 0.700 |
| TTF | 0.210 | 0.210 |
| GFP | 0.217 | 0.217 |
| BFL | 1.127 | 1.127 |
| EFL | 4.045 | 3.852 |
| TL | 3.904 | 3.829 |
| TTL | 5.030 | 4.956 |
| ALT | 2.963 | 3.188 |
| AAG | 0.940 | 0.641 |
| TTL/T1 | 5.133 | 4.029 |
| Tmax/TTmax | 1.040 | 2.003 |

FIG. 20

OPTICAL IMAGING LENS MODULE

CROSS-REFERENCE TO RELATED APPLICATIONS

This application claims priority to P.R.C. Patent Application No. 201911408115.3 titled "Optical Imaging Lens Module," filed on Dec. 31, 2019, with the State Intellectual Property Office of the People's Republic of China (SIPO).

TECHNICAL FIELD

The present disclosure relates to an optical imaging lens module, and particularly, to an optical imaging lens module for capturing image and video.

BACKGROUND

In order to make consumers feel a wider field of view when using portable electronic devices, current portable electronic devices have begun to pursue full-screen design, so the area ratio of optical imaging lens module to the screen also needs to be designed smaller.

Therefore, how to maintain the original required shooting angle but have a small front surface area of the lens is a problem that needs to be solved first.

SUMMARY

In light of the abovementioned problems, in addition to the optical imaging lens module having higher pixel and imaging quality, improving the problem of larger area ration of the optical imaging lens module to the screen, and maintaining the original required shooting angle are the improvement points of the invention.

The present disclosure provides an optical imaging lens module for capturing image and video such as the optical imaging lens of cell phones, cameras, tablets and personal digital assistants. By overall designing of lens barrels and lens elements, the area ration of the optical imaging lens module to the screen and the system length of the optical imaging lens can be reduced, and the large field of view of the optical imaging lens can be maintained while improving imaging quality or assembly yield.

In the specification, parameters used herein may include:

| Parameter | Definition |
| --- | --- |
| T1 | A thickness of the first lens element along the optical axis |
| G12 | A distance from the image-side surface of the first lens element to the object-side surface of the second lens element along the optical axis, i.e., an air gap between the first lens element and the second lens element along the optical axis |
| T2 | A thickness of the second lens element along the optical axis |
| G23 | A distance from the image-side surface of the second lens element to the object-side surface of the third lens element along the optical axis, i.e., an air gap between the second lens element and the third lens element along the optical axis |
| T3 | A thickness of the third lens element along the optical axis |
| G34 | A distance from the image-side surface of the third lens element to the object-side surface of the fourth lens element along the optical axis, i.e., an air gap between the third lens element and the fourth lens element along the optical axis |
| T4 | A thickness of the fourth lens element along the optical axis |
| G45 | A distance from the image-side surface of the fourth lens element to the object-side surface of the fifth lens element along the optical axis, i.e., an air gap between the fourth lens element and the fifth lens element along the optical axis |
| T5 | A thickness of the fifth lens element along the optical axis |
| G56 | A distance from the image-side surface of the fifth lens element to the object-side surface of the sixth lens element along the optical axis, i.e., an air gap between the fifth lens element and the sixth lens element along the optical axis |
| T6 | A thickness of the sixth lens element along the optical axis |
| G6F | A distance from the image-side surface of the sixth lens element to the object-side surface of the filtering unit along the optical axis, i.e., an air gap between the sixth lens element and the filtering unit |
| TTF | A thickness of the filtering unit along the optical axis |
| GFP | An air gap between the filtering unit and the image plane along the optical axis |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| n6 | A refractive index of the sixth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| HFOV | A half field of view of the optical imaging lens |
| Fno | A F-number of the optical imaging lens |
| EFL | An effective focal length of the optical imaging lens |

-continued

| Parameter | Definition |
| --- | --- |
| TTL | A distance from the object-side surface of the first lens element to the image plane along the optical axis, i.e., a system length of the optical imaging lens |
| ALT | A sum of the thicknesses of six lens elements from the first lens element to the sixth lens element along the optical axis, i.e., a sum of T1, T2, T3, T4, T5, and T6 |
| AAG | A sum of five air gaps from the first lens element to the sixth lens element along the optical axis, i.e., a sum of G12, G23, G34, G45, and G56 |
| BFL | A distance from the image-side surface of the sixth lens element to the image plane along the optical axis, i.e., a sum of G6F, TTF and GFP |
| TL | A distance from the object-side surface of the first lens element to the image-side surface of the sixth lens element along the optical axis |
| ImgH | An image height of the optical imaging lens |
| S1 | A distance from the surface of the lens barrel closest to the object side to the image-side surface of the first lens element along the optical axis |
| Rmin | A minimum vertical distance from the intersection of the object-side surface of the first lens element and the extension surface to the optical axis |
| Rmax | A maximum vertical distance from the intersection of the object-side surface of the first lens element and the extension surface to the optical axis |
| Bmin | A minimum distance from the front end near the object side of the outer annular surface of the surrounding portion of the lens barrel to the optical axis |
| Bmax | A maximum distance from the front end near the object side of the outer annular surface of the surrounding portion of the lens barrel to the optical axis |
| Tmax | A maximum thickness of the plurality of lens elements along the optical axis |
| TTmax | A second largest thickness of the plurality of lens elements along the optical axis |
| ω | An angle between the extension surface of the first lens element and the optical axis |

According to an embodiment of the optical imaging lens module of the present disclosure, the optical imaging lens module may comprise a lens barrel and an optical imaging lens. The optical imaging lens may include a plurality of lens elements engaged with the lens barrel in an order from an object side to an image side along an optical axis. A first lens element is the lens element closest to the object side in the plurality of lens elements. The first lens element may include an optical effective portion and an optical ineffective portion surrounding the optical effective portion. The optical effective portion may include an object-side surface facing toward the object side and allowing imaging rays to pass through as well as an image-side surface facing toward the image side and allowing the imaging rays to pass through. A border around the object-side surface may have an extension surface extending from the object side toward the image side. The optical imaging lens module may satisfy an inequality: $1.000$ degrees$\leq\omega\leq5.000$ degrees. Therefore, the optical imaging lens module provided in this embodiment can effectively reduce the area ratio of the optical imaging lens module to the screen of the portable electronic device while maintaining a large field of view. In addition, since the extension surface of the lens element is a sensitive area that affects imaging quality, conforming to this angle range can reduce the damage of the lens element during the forming stage and further improve the manufacturing yield.

The lens barrel of the optical imaging lens module provided in this embodiment may further include a surrounding portion, which surrounds the extension surface. The optical imaging lens module may further satisfy an inequality: $0.950<S1/T1\leq1.050$. This can effectively reduce stray light and maintain good imaging quality.

According to another embodiment of the optical imaging lens module of the present disclosure, the optical imaging lens module may comprise a lens barrel and an optical imaging lens. The optical imaging lens may include a plurality of lens elements engaged with the lens barrel in an order from an object side to an image side along an optical axis. A first lens element is the lens element closest to the object side in the plurality of lens elements. The first lens element may include an optical effective portion and an optical ineffective portion surrounding the optical effective portion. The optical effective portion may include an object-side surface facing toward the object side and allowing imaging rays to pass through as well as an image-side surface facing toward the image side and allowing the imaging rays to pass through. A border around the object-side surface may have an extension surface extending from the object side toward the image side. The lens barrel may have an engaging portion, which may be disposed between the object side and the optical ineffective portion of the first lens element, and engaged with the optical ineffective portion of the first lens element. The optical imaging lens module may satisfy an inequality: $S1/T1\leq0.950$. Therefore, the optical imaging lens module can effectively reduce the area ratio of the optical imaging lens module to the screen of the portable electronic device while maintaining a large field of view, in which a further restriction for the inequality, $S1/T1\leq0.950$, defined below may have better manufacturing yield: $0.200\leq S1/T1\leq0.950$. Besides, the engaging portion is disposed between the object side and the optical ineffective portion of the first lens element, and engaged with the optical ineffective portion of the first lens element, such that the first lens element can be more stably fixed to the lens barrel without other components, and does not need to be glued during assembly, so it can increase the yield on assembly and the stability on use.

In any one of abovementioned two exemplary embodiments, the optical imaging lens module may satisfy an inequality: $Rmin/T1\leq1.300$, which may provide better effect of reducing the area ratio of the optical imaging lens module to the screen of the portable electronic device while maintaining a large field of view. In addition, a further restriction for the inequality, $Rmin/T1\leq1.300$, defined below may constitute better configuration: $0.400\leq Rmin/T1\leq1.300$.

In any one of abovementioned two exemplary embodiments, the lens barrel may further comprise a surrounding portion, which surrounds the extension surface and is connected to the engaging portion. The above configuration with an aperture stop arranged between the object side and the first lens element can have better imaging quality.

With regard to the optical imaging lens module with the surrounding portion, the surrounding portion may have an inner annular surface and an outer annular surface, and the inner annular surface and the outer annular surface are parallel to the extension surface. The optical imaging lens module may satisfy an inequality: Bmin/T1≤1.300, which may provide better effect of reducing the area ratio of the optical imaging lens module to the screen of the portable electronic device while maintaining a large field of view. In addition, a further restriction for the inequality, Bmin/T1≤1.300 defined below may constitute better configuration: 0.400≤Bmin/T1≤1.300.

In any one of abovementioned two exemplary embodiments, the extension surface may be coated with an opaque coating, which can replace the aperture stop to block unnecessary light from passing. The surface of the optical ineffective portion may also be coated with an opaque coating, which can effectively absorb stray light. The material of the opaque coating may be graphite.

The extension surface or the surface of the optical ineffective portion may be subjected to a surface treatment, such as sandblasting, laser engraving, and the like. The optical imaging lens module may satisfy an inequality: Ra≥0.200 μm, in which a surface roughness of the extension surface or the surface of the optical ineffective portion is represented by Ra. This can improve the adhesion of the coating and reduce stray light. According to different stray light, it can be combined with different surface treatments. The preferred roughness range is 0.200 μm≤Ra≤2.000 μm.

In any one of abovementioned two exemplary embodiments, The optical imaging lens module may satisfy an inequality: TTL/T1≤8.000. In this way, the thickness of the first lens element along the optical axis is thicker, which may be beneficial for making an extension surface of the first lens element from the object side to the image side, such that the purpose of reducing the area ratio of the optical imaging lens module to the screen of the portable electronic device can be achieved. At the same time, a range that satisfies this inequality can also have an advantage to shorten the length of the optical imaging lens module. The preferred range may be 4.000≤TTL/T1≤8.000.

In any one of abovementioned two exemplary embodiments, the extension surface of the first lens element may further have a first cutting plane formed between the object-side surface and the image-side surface of the first lens element, so that the optical imaging lens module satisfies an inequality: Rmin/Rmax≤0.900. In this way, the unnecessary areas that do not affect imaging can be cut off, which may be beneficial for reducing the area ratio of the optical imaging lens module to the screen of the portable electronic device. The preferred range is 0.600≤Rmin/Rmax≤0.900.

With regard to the optical imaging lens module with the surrounding portion, the extension surface of the first lens element may further have a first cutting plane formed between the object-side surface and the image-side surface of the first lens element, and the surrounding portion of the lens barrel may also have a third cutting plane corresponding to the first cutting plane. The surrounding portion has an inner annular surface and an outer annular surface. The inner annular surface and the outer annular surface may be both parallel to the extension surface, such that the optical imaging lens module may satisfy an inequality: Bmin/Bmax≤0.900. In this way, the unnecessary areas that do not affect imaging can be cut off, which may be beneficial for reducing the area ratio of the optical imaging lens module to the screen of the portable electronic device. The preferred range is 0.650≤Bmin/Bmax≤0.900. Further, the extension surface may have a second cutting plane opposite to the first cutting plane, and the surrounding portion may also have a fourth cutting plane opposite to the third cutting plane, such that the optical imaging lens module may satisfy an inequality: Bmin/Bmax≤0.900, which may also have the effect of reducing the area ratio of the optical imaging lens module to the screen of the portable electronic device. The preferred range is 0.650≤Bmin/Bmax≤0.900.

In any one of abovementioned two exemplary embodiments, the optical imaging lens module may further satisfy an inequality: Tmax/TTmax≥1.040, which may also have the effect of reducing the area ratio of the optical imaging lens module to the screen of the portable electronic device.

The exemplary limited inequalities listed above can also be combined in any number of different amounts and applied to the embodiments of the present invention, and are not limited to this. In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated into the example embodiments if no inconsistency occurs.

Through controlling the convex or concave shape of the surfaces and the overall design of the lens barrel, the optical imaging lens in the example embodiments may reduce the area ratio of the optical imaging lens module to the screen, and the system length of the optical imaging lens may be reduced, the field of view may be broaden and the yield in the assembly process may be increased.

BRIEF DESCRIPTION OF THE DRAWINGS

Exemplary embodiments will be more readily understood from the following detailed description when read in conjunction with the appended drawings, in which:

FIG. 14 depicts a table of optical data for each lens element of the optical imaging lens according to the seventh embodiment of the present disclosure;

FIG. 15 depicts a table of aspherical data of the optical imaging lens according to the seventh embodiment of the present disclosure;

FIG. 18 depicts a table of optical data for each lens element of the optical imaging lens according to the eighth embodiment of the present disclosure;

FIG. 19 depicts a table of aspherical data of the optical imaging lens according to the eighth embodiment of the present disclosure;

FIG. 20 is a table for the values of T1, G12, T2, G23, T3, G34, T4, G45, T5, G56, T6, G6F, TTF, GFP, BFL, EFL, TL, TTL, ALT, AAG, TTL/T1, and Tmax/TTmax as determined in the seventh and eighth embodiments.

DETAILED DESCRIPTION

The terms "optical axis region", "periphery region", "concave", and "convex" used in this specification and claims should be interpreted based on the definition listed in the specification by the principle of lexicographer.

Figure 1:
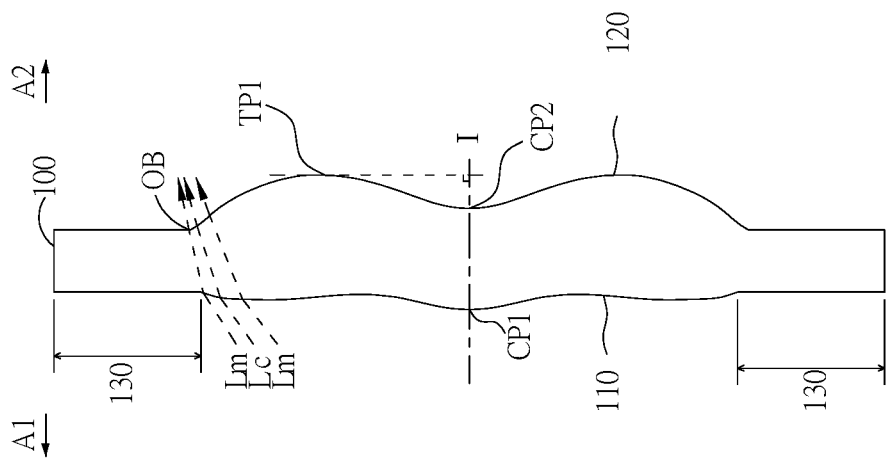
FIG. 1 depicts a cross-sectional view of one single lens element according to one embodiment of the present disclosure.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
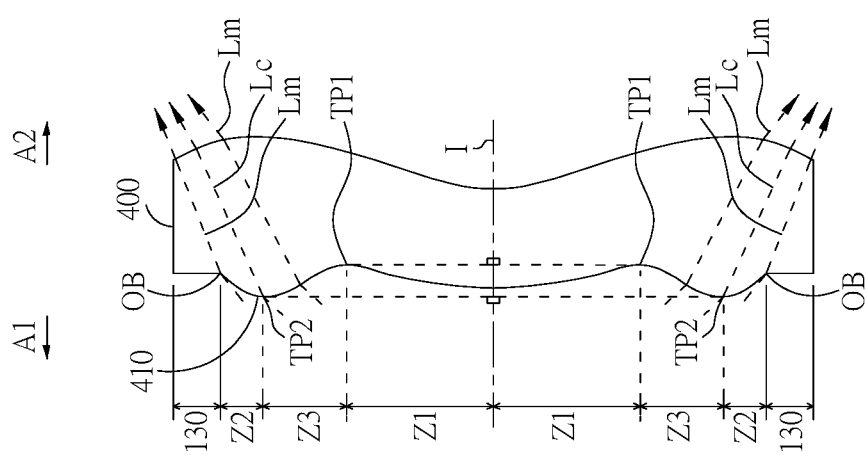
FIG. 4 depicts a schematic view of a second example of a surface shape and an effective radius of a lens element.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
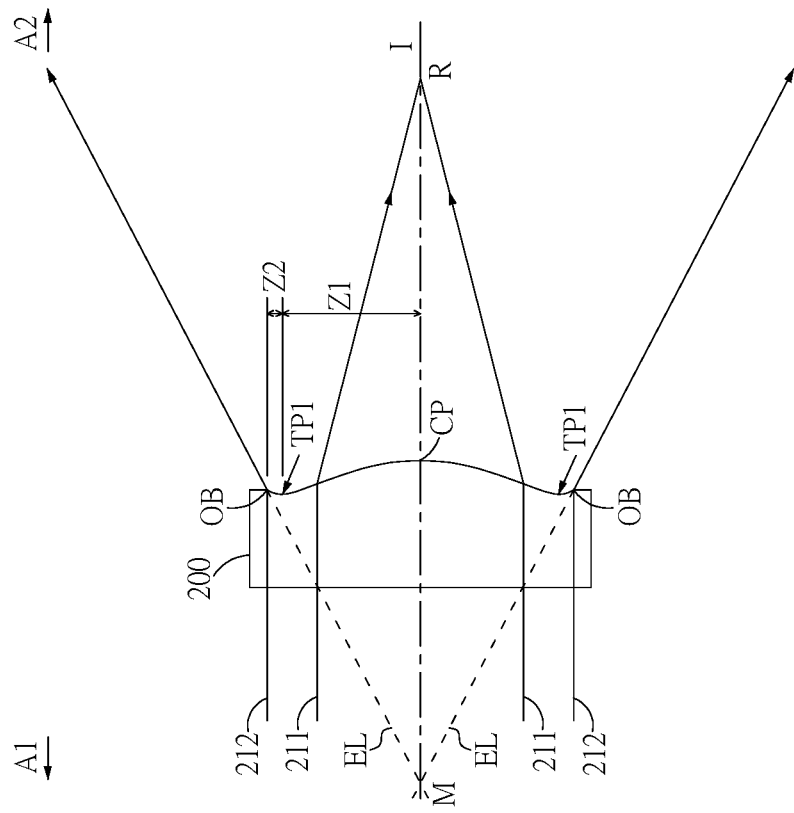
FIG. 2 depicts a schematic view of a relation between a surface shape and an optical focus of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
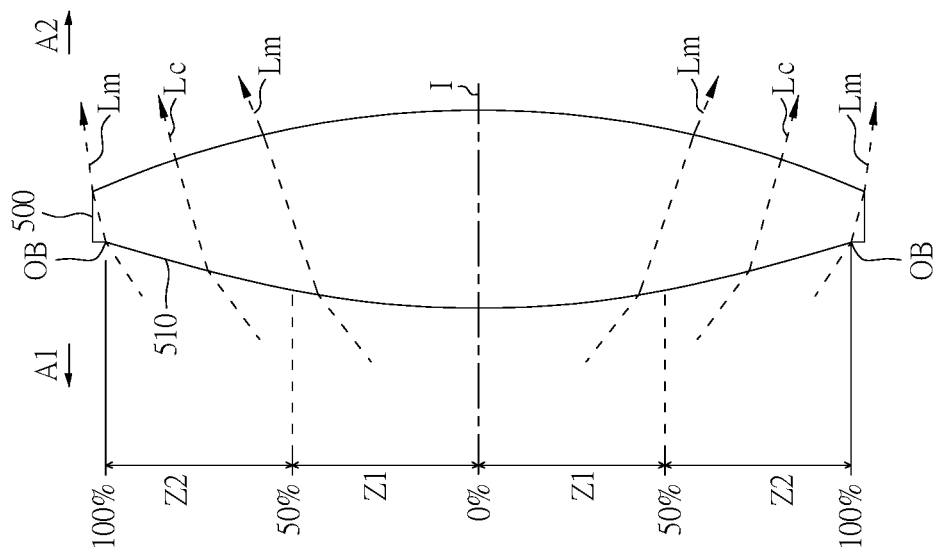
FIG. 5 depicts a schematic view of a third example of a surface shape and an effective radius of a lens element.
Figure 3:
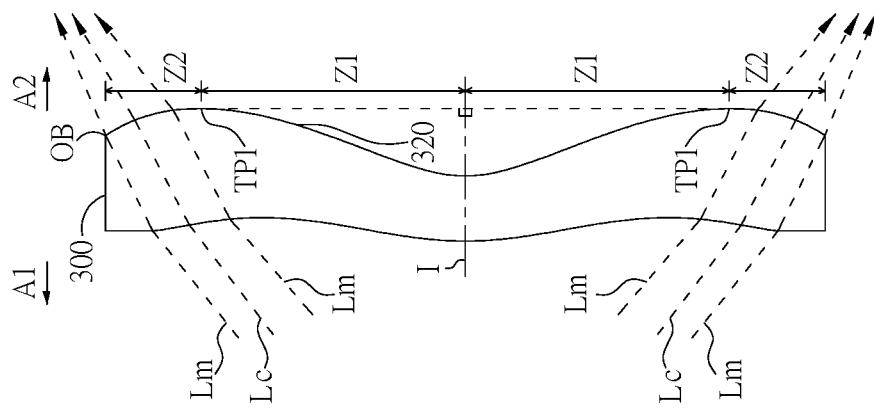
FIG. 3 depicts a schematic view of a first example of a surface shape and an effective radius of a lens element.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

The range of values within the maximum and minimum values derived from the combined ratios of the optical parameters can be implemented according to the following embodiments.

Figure 6A:
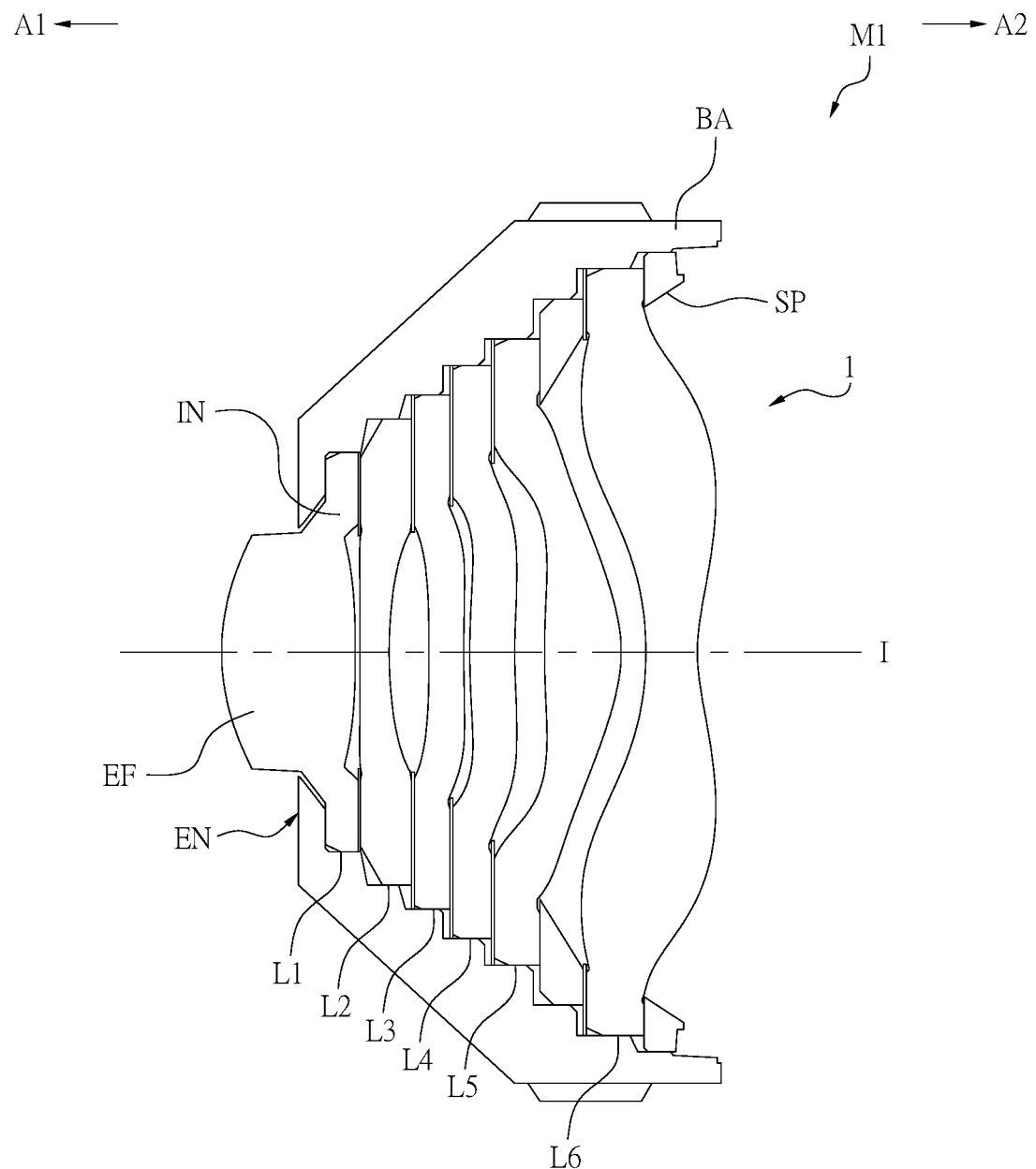
FIG. 6A depicts a cross-sectional view of the optical imaging lens module according to the first embodiment of the present disclosure.
Figure 6B:
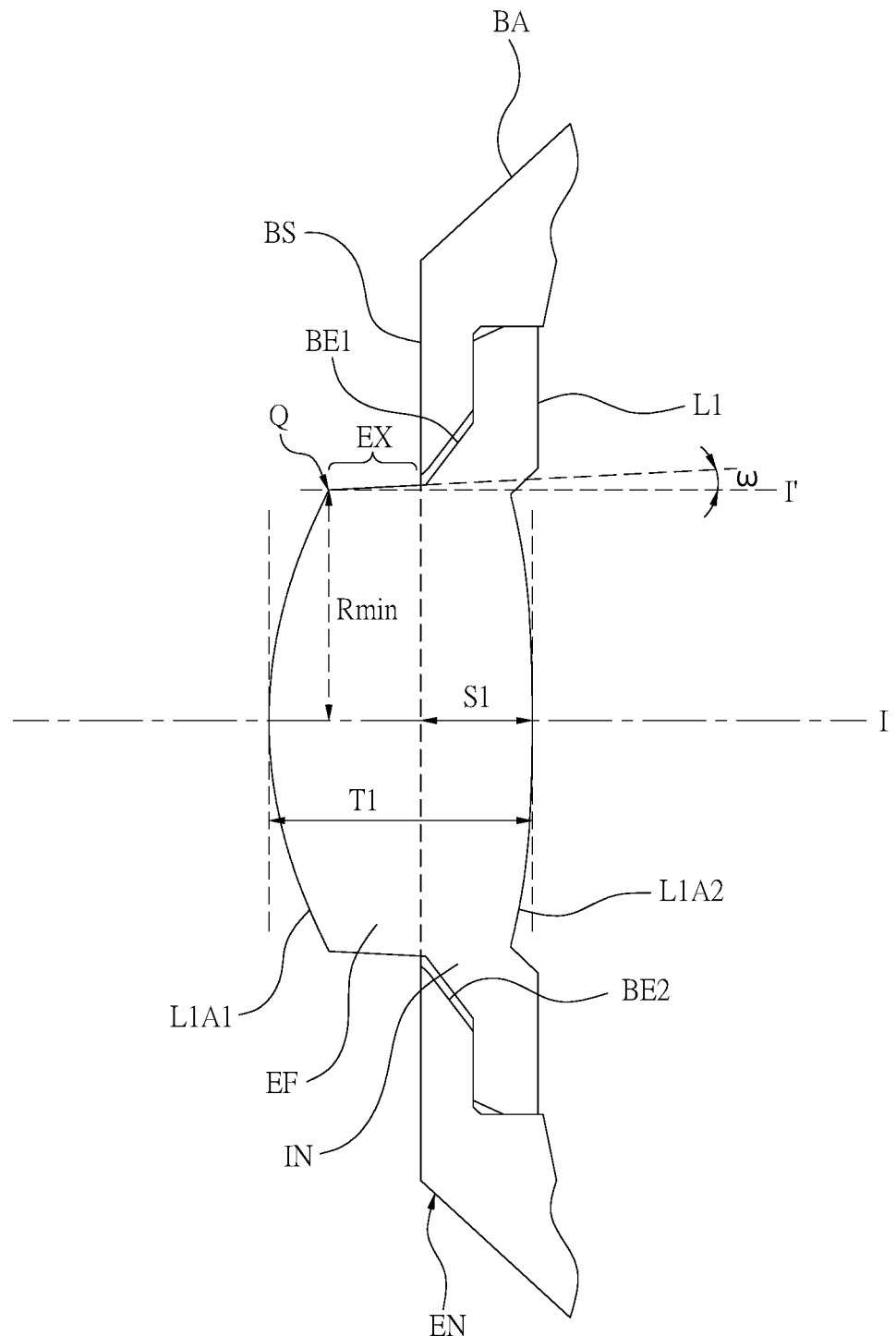
FIG. 6B depicts a partial enlarged structure view of the optical imaging lens module according to the first embodiment of the present disclosure.

Reference is now made to FIGS. 6A and 6B. FIG. 6A illustrates a cross-sectional view of the optical imaging lens module M1 according to the first embodiment of the present disclosure. FIG. 6B illustrates a partial enlarged structure view of the optical imaging lens module M1 according to the first embodiment of the present disclosure.

As shown in FIG. 6A, the optical imaging lens module M1 of the present embodiment may comprise a lens barrel BA and an optical imaging lens 1. The optical imaging lens 1 may comprise at least one lens element. For example, the optical imaging lens 1 comprises six lens elements, in an order from an object side A1 to an image side A2 along an optical axis, a first lens element L1, a second lens element L2, a third lens element L3, a fourth lens element L4, a fifth lens element L5, and a sixth lens element L6, but it is not limited to this. Each of the first, second, third, fourth, fifth, and sixth lens elements L1, L2, L3, L4, L5, L6 may comprise an object-side surface L1A1/L2A1/L3A1/L4A1/

L5A1/L6A1 facing toward the object side A1 and an image-side surface L1A2/L2A2/L3A2/L4A2/L5A2/L6A2 facing toward the image side A2.

In order to make the optical imaging lens 1 more stably engaged with the lens barrel BA, the optical imaging lens module M1 may further comprise a plurality of spacing units SP. The plurality of spacing units SP may be disposed on the inner side of the lens barrel BA and between any two adjacent lens elements, such that the first lens element L1, the second lens element L2, the third lens element L3, the fourth lens element L4, the fifth lens element L5, and the sixth elements L6 may be disposed spaced apart.

As shown in FIG. 6B, the first lens element L1 is the lens element closest to the object side in the plurality of lens elements. The first lens element L1 may include an optical effective portion EF and an optical ineffective portion IN surrounding the optical effective portion EF. The optical effective portion EF may include an object-side surface L1A1 facing toward the object side A1 and allowing imaging rays to pass through as well as an image-side surface L1A2 facing toward the image side A2 and allowing the imaging rays to pass through. A border around the object-side surface L1A1 may have an extension surface EX extending from the object side A1 toward the image side A2. An angle between the extension surface EX and the optical axis I (using the optical axis I' which is parallel to the optical axis I to represent), ω, may satisfy an inequality: 1.000 degree≤ω≤5.000 degrees.

As shown in FIGS. 6A and 6B, the lens barrel BA may have an engaging portion EN, disposed between the object side A1 and the optical ineffective portion IN of the first lens element L1. The optical ineffective portion IN of the first lens element L1 may be engaged with the engaging portion EN of the lens barrel BA near the object A1. The optical ineffective portion IN may have a first engaging surface BE1 extending from the object side A1 toward the image side A2, the first engaging surface BE1 may connect with the extension surface EX. The lens barrel BA may have an engaging portion EN near the object side A1, the inner side of the engaging portion EN may have a second engaging surface BE2 corresponding to the first engaging surface BE1. According to one embodiment, the first engaging surface BE1 and the second engaging surface BE2 may have the same slope or curvature and contact each other. According to another embodiment, the engaging portion EN may cover at least the first engaging surface BE1, so that the optically ineffective portion IN can be hidden in the lens barrel BA. In this embodiment, the surface of the lens barrel BA closest to the object side A1 is the surface of the engaging portion EN of the lens barrel BA closest to the object side A1, BS, in which the relationship between the distance from the surface of the lens barrel BA closest to the object side A1 to the image-side surface L1A2 of the first lens L1 along the optical axis I, S1, and the thickness of the first lens L1 along the optical axis I, T1, may satisfy an inequality: S1/T1≤0.950. In this embodiment, the minimum vertical distance Rmin from an intersection of the object-side surface L1A1 and the extension surface EX of the first lens element L1 to the optical axis I is about 0.880 mm, and the optical imaging lens module M1 may satisfy an inequality: Rmin/T1≤1.300.

In practice, the engaging portion EN may be not in contact with the extension surface EX. In addition, the extension surface EX is exposed outside the lens barrel BA.

According to one embodiment, the extension surface EX may be subjected to a surface treatment to increase the roughness and coated with an opaque coating, such as graphite. The coating of the extension surface EX can replace the aperture stop to block unnecessary light from passing. The first engaging surface BE1 may also be coated with an opaque coating to absorb stray light.

Figure 7A:
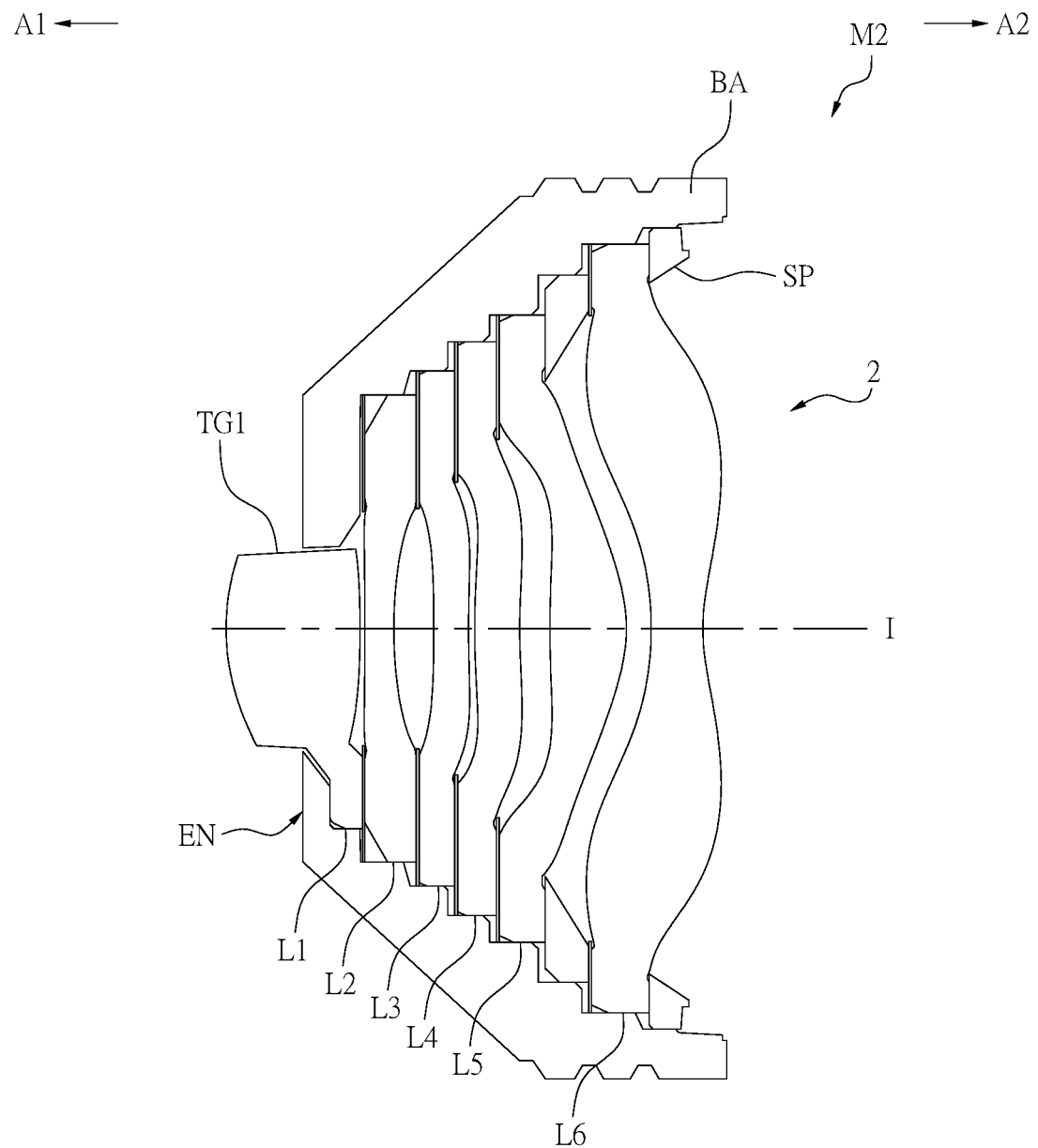
FIG. 7A depicts a cross-sectional view of the optical imaging lens module according to the second embodiment of the present disclosure.
Figure 7B:
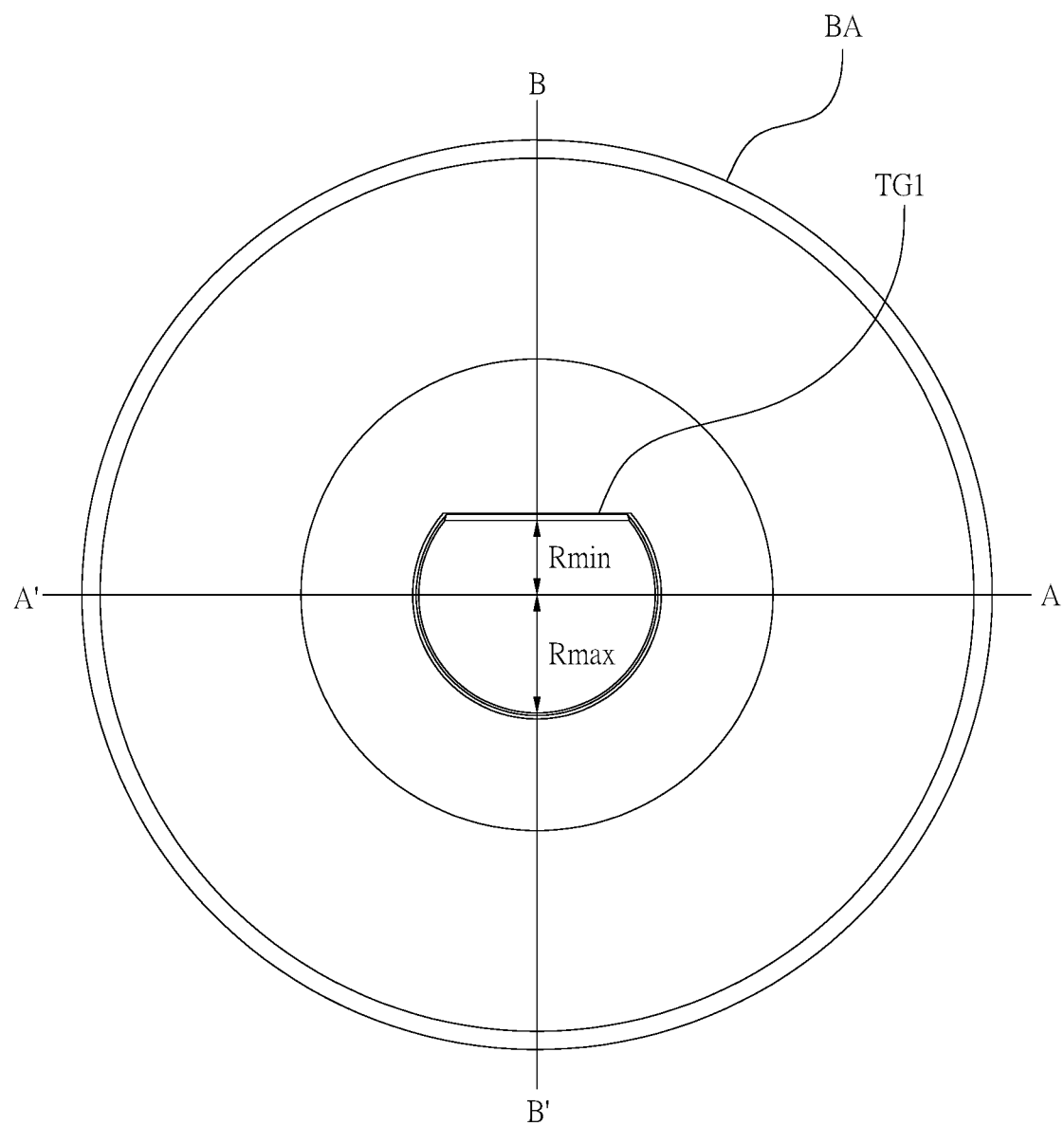
FIG. 7B depicts a front view of the optical imaging lens module according to the second embodiment of the present disclosure.

As shown in FIGS. 7A and 7B. FIG. 7A illustrates a cross-sectional view of the optical imaging lens module M2 according to the second embodiment of the present disclosure. FIG. 7B illustrates a front view of the optical imaging lens module M2 according to the second embodiment of the present disclosure. FIG. 7A is a cross-sectional view taken along the line BB' in FIG. 7B, and an intersection point of the cross-section line AA' and the cross-section line BB' is a point at which the optical axis I passes.

The optical imaging lens module M2 may be generally similar to the optical imaging lens module M1. The optical imaging lens module M2 may comprise a lens barrel BA and an optical imaging lens 2. The differences between the optical imaging lens module M1 and the optical imaging lens module M2 may include that the extension surface EX of the first lens element L1 of the optical imaging lens module M2 further comprises a first cutting plane TG1 disposed between the object-side surface L1A1 and the image-side surface L1A2 of the first lens element L1, and the outline of the optical effective portion EF of the first lens element L1 is shown as a D-shape in the front view. Referring to FIG. 6B, in the first embodiment, the vertical distance from the intersection point of the object-side surface L1A1 and extension surface EX of the first lens element L1 of the optical imaging lens module M1, Q, to the optical axis I is a constant. Referring to FIG. 7B, since the first lens element L1 of the optical imaging lens module M2 of the second embodiment has the first cutting plane TG1, the vertical distance from the intersection point of the object-side surface L1A1 and the extension surface EX of the first lens element L1, Q, to the optical axis I may be distributed in a range between a minimum Rmin and a maximum Rmax. In this embodiment, Rmin is about 0.550 mm, and Rmax is about 0.880 mm. In order to indicate the position of the first cutting plane TG1 on the first lens element L1, the optical imaging lens module M2 may satisfy an inequality: Rmin/Rmax≤0.900.

Figure 8A:
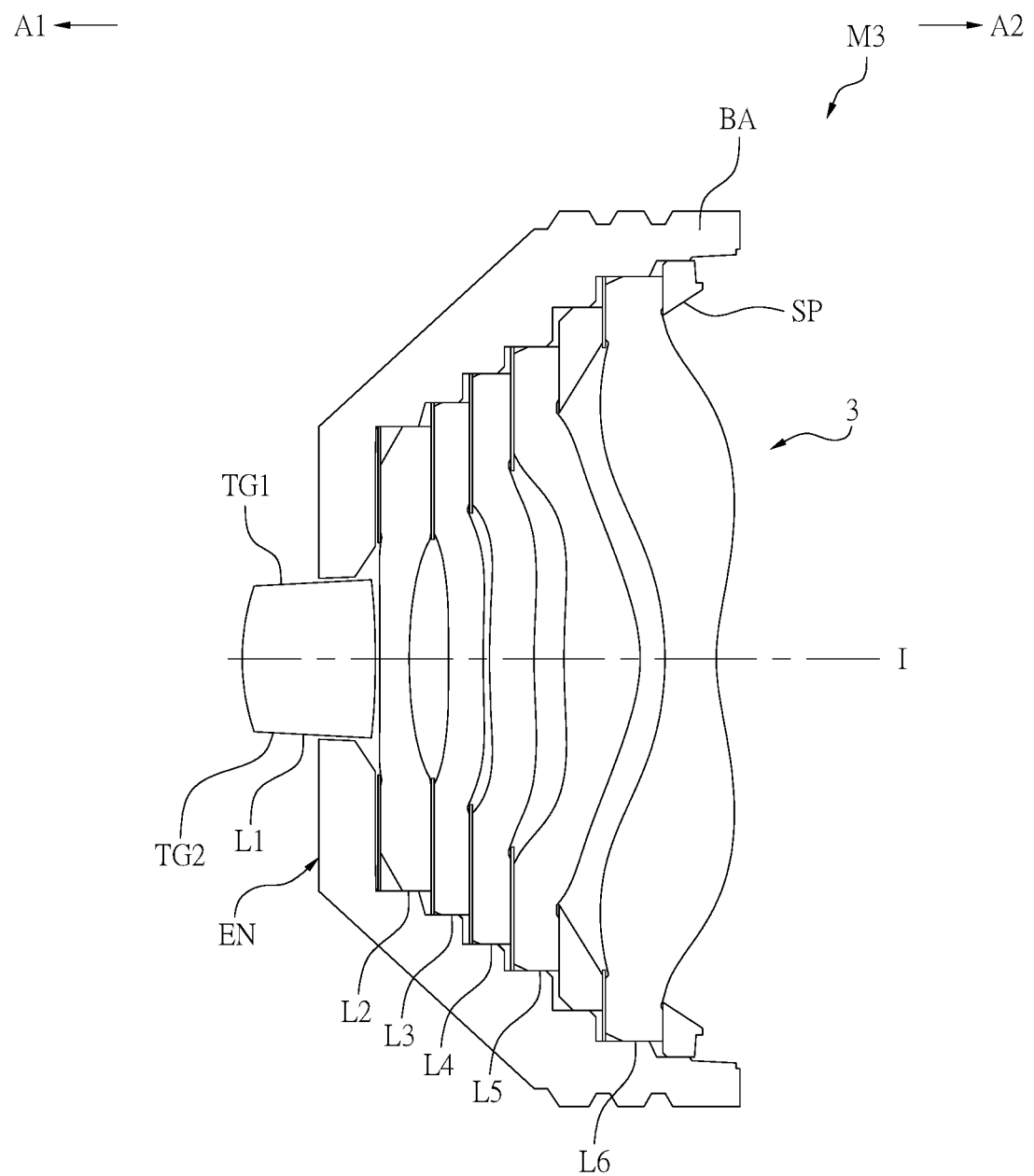
FIG. 8A depicts a cross-sectional view of the optical imaging lens module according to the third embodiment of the present disclosure.
Figure 8B:
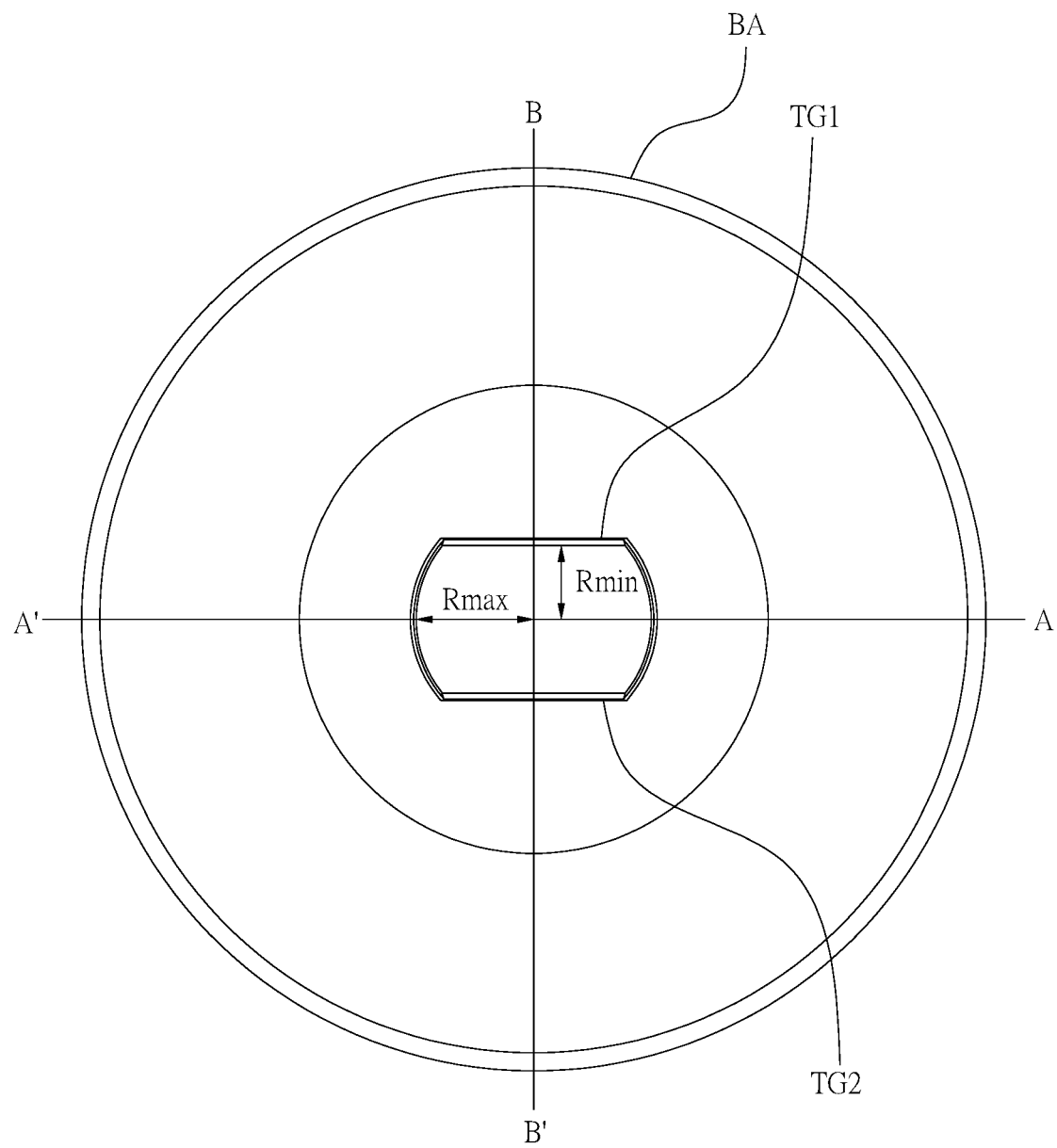
FIG. 8B depicts a cross-sectional view of the optical imaging lens module according to the third embodiment of the present disclosure.

As shown in FIGS. 8A and 8B. FIG. 8A illustrates a cross-sectional view of the optical imaging lens module M3 according to the third embodiment of the present disclosure. FIG. 8B illustrates a front view of the optical imaging lens module M3 according to the third embodiment of the present disclosure. The optical imaging lens module M3 may be generally similar to the optical imaging lens module M2. The optical imaging lens module M3 may comprise a lens barrel BA and an optical imaging lens 3. The differences between the optical imaging lens module M2 and the optical imaging lens module M3 may include that the extension surface EX of the first lens element L1 of the optical imaging lens module M3 further comprises a second cutting plane TG2 disposed between the object-side surface L1A1 and the image-side surface L1A2 of the first lens element L1, and opposite to a first cutting plane TG1.

In this embodiment, Rmin is about 0.550 mm, and Rmax is about 0.880 mm. In order to indicate the positions of the first cutting plane TG1 and the second cutting plane TG2 on the first lens element L1, the optical imaging lens module M3 may satisfy an inequality: Rmin/Rmax≤0.900.

Figure 9:
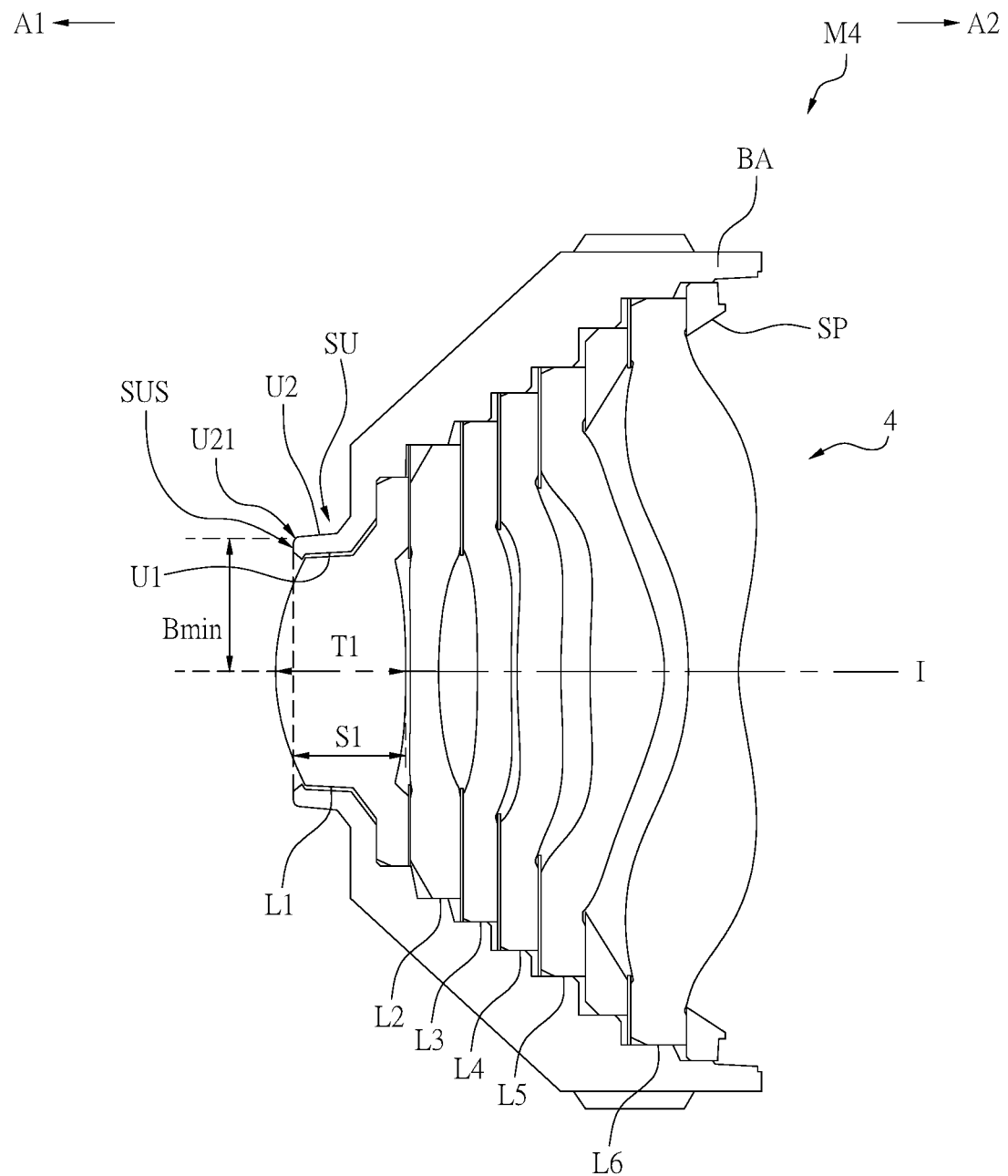
FIG. 9 depicts a cross-sectional view of the optical imaging lens module according to the fourth embodiment of the present disclosure.

Referring to FIG. 9. FIG. 9 illustrates a cross-sectional view of the optical imaging lens module M4 according to the fourth embodiment of the present disclosure. The optical imaging lens module M4 may be generally similar to the optical imaging lens module M1. The optical imaging lens module M4 may comprise a lens barrel BA and an optical imaging lens 4. The differences between the optical imaging lens module M1 and the optical imaging lens module M4 may include that the lens barrel BA of the optical imaging lens module M4 may further comprise a surrounding portion SU surrounding the extension surface EX and connected with the engaging portion EN. In practice, the surrounding portion SU and the extension surface EX may be attached each other.

The surrounding portion SU may have an inner annular surface U1 and an outer annular surface U2, in which the inner annular surface U1 and the outer annular surface U2 may be parallel to the extension surface EX, and the distance from the front end U21 near the object side A1 of the outer annular surface U2 to the optical axis I is a constant.

In this embodiment, the surface of the lens barrel BA closest to the object side A1 is the surface of the surrounding portion SU closest to the object side A1, SUS. The relationship between the distance from the surface of the lens barrel BA closest to the object side A1 to the image-side surface L1A2 of the first lens element L1 along the optical axis I, S1, and the thickness of the first lens element L1 along the optical axis, T1, satisfies an inequality: $S1/T1 \leq 0.950$, but it is not limited to this. The relationship also satisfies an inequality: $0.950 < S1/T1 \leq 1.050$. In this embodiment, a minimum vertical distance of the front end U21 of the outer annular surface U2 of the surrounding portion SU of the lens barrel BA near the object side A1 to the optical axis I is about 1.025 mm, and the relationship may also satisfy an inequality: $Bmin/T1 \leq 1.300$.

Figure 10A:
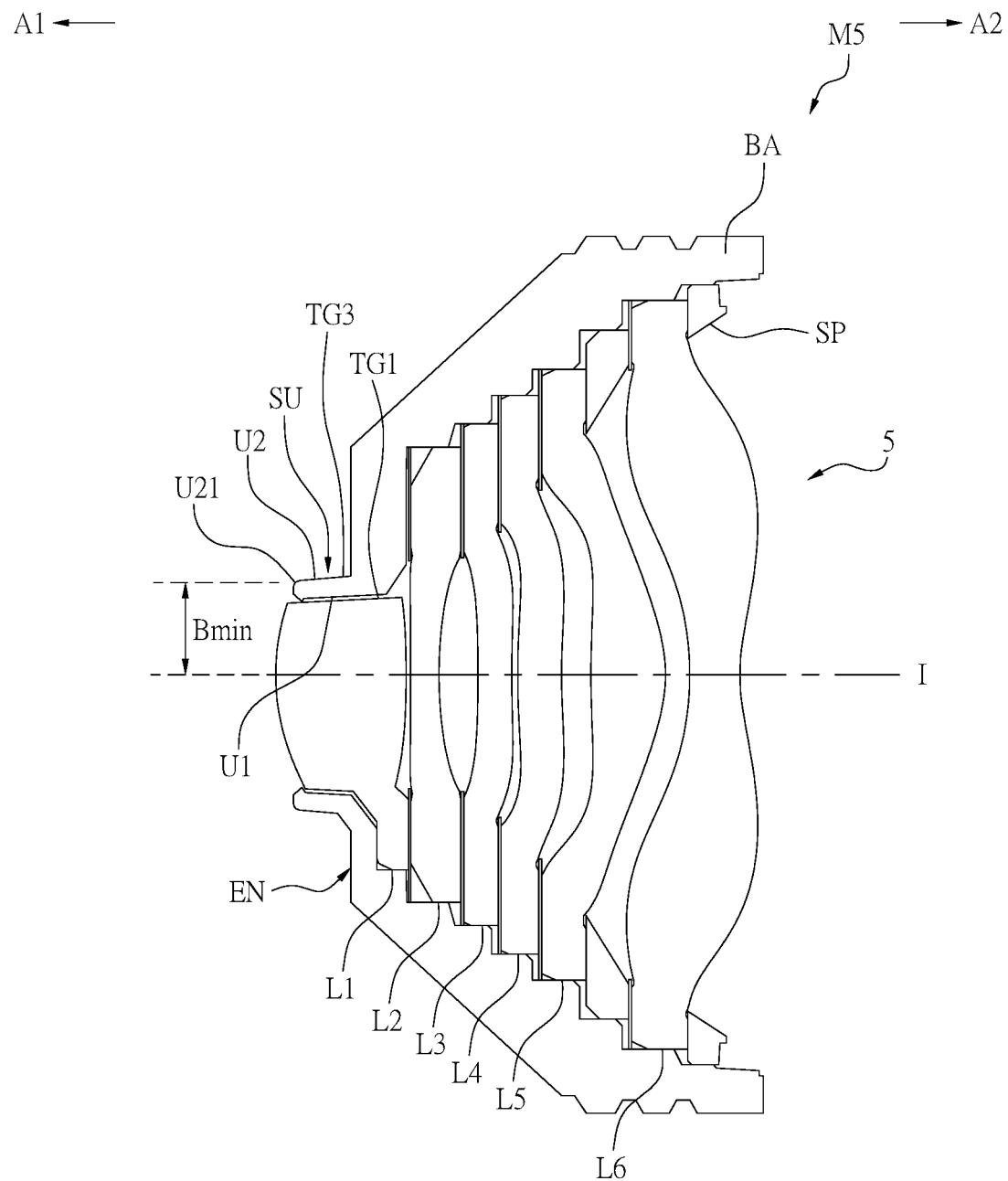
FIG. 10A depicts a cross-sectional view of the optical imaging lens module according to the fifth embodiment of the present disclosure.
Figure 10B:
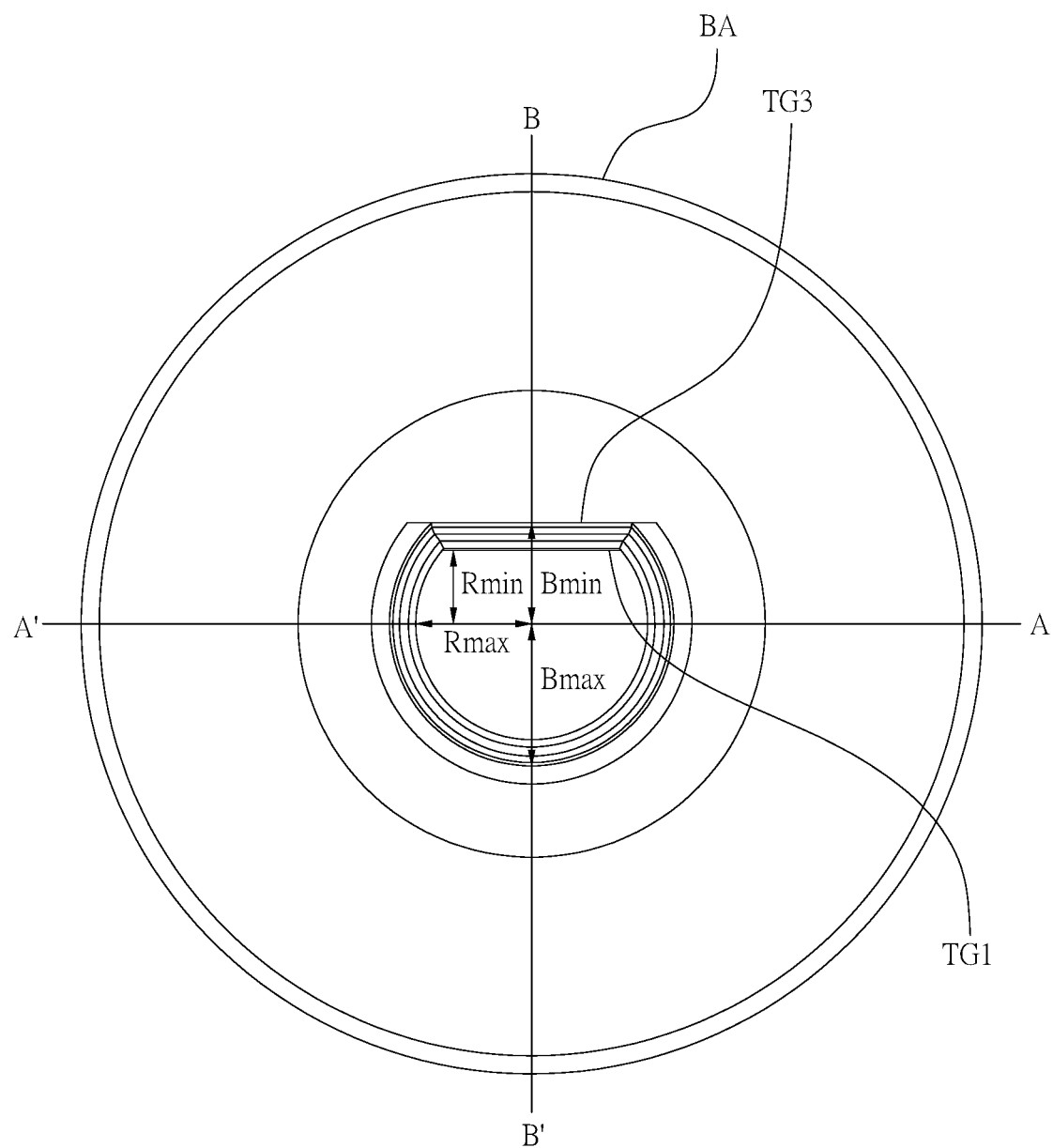
FIG. 10B depicts a front view of the optical imaging lens module according to the fifth embodiment of the present disclosure.

As shown in FIGS. 10A and 10B. FIG. 10A illustrates a cross-sectional view of the optical imaging lens module M5 according to the fifth embodiment of the present disclosure. FIG. 10B illustrates a front view of the optical imaging lens module M5 according to the fifth embodiment of the present disclosure. The optical imaging lens module M5 may be generally similar to the optical imaging lens module M4. The optical imaging lens module M5 may comprise a lens barrel BA and an optical imaging lens 5. The differences between the optical imaging lens module M4 and the optical imaging lens module M5 may include that the extension surface EX of the first lens element L1 of the optical imaging lens module M5 may further comprise a first cutting plane TG1, and the surrounding portion SU of the lens barrel BA may further comprise a third cutting plane TG3 corresponding to the first cutting plane TG1.

Since the surrounding portion SU of the fifth embodiment has the third cutting plane TG3, the distance from the front end U21 near the object side A1 of the outer annular surface U2 of the surrounding portion SU to the optical axis I may be distributed in a range between a minimum Bmin and a maximum Bmax. In this embodiment, Bmin is about 0.705 mm, and Bmax is about 1.025 mm. In order to indicate the position of the third cutting plane TG3 on the surrounding portion SU, the optical imaging lens module M5 may satisfy an inequality: $Bmin/Bmax \leq 0.900$.

In order to indicate the position of the first cutting plane TG1 on the first lens element L1, the optical imaging lens module M5 may satisfy an inequality: $Rmin/Rmax \leq 0.900$.

Figure 11A:
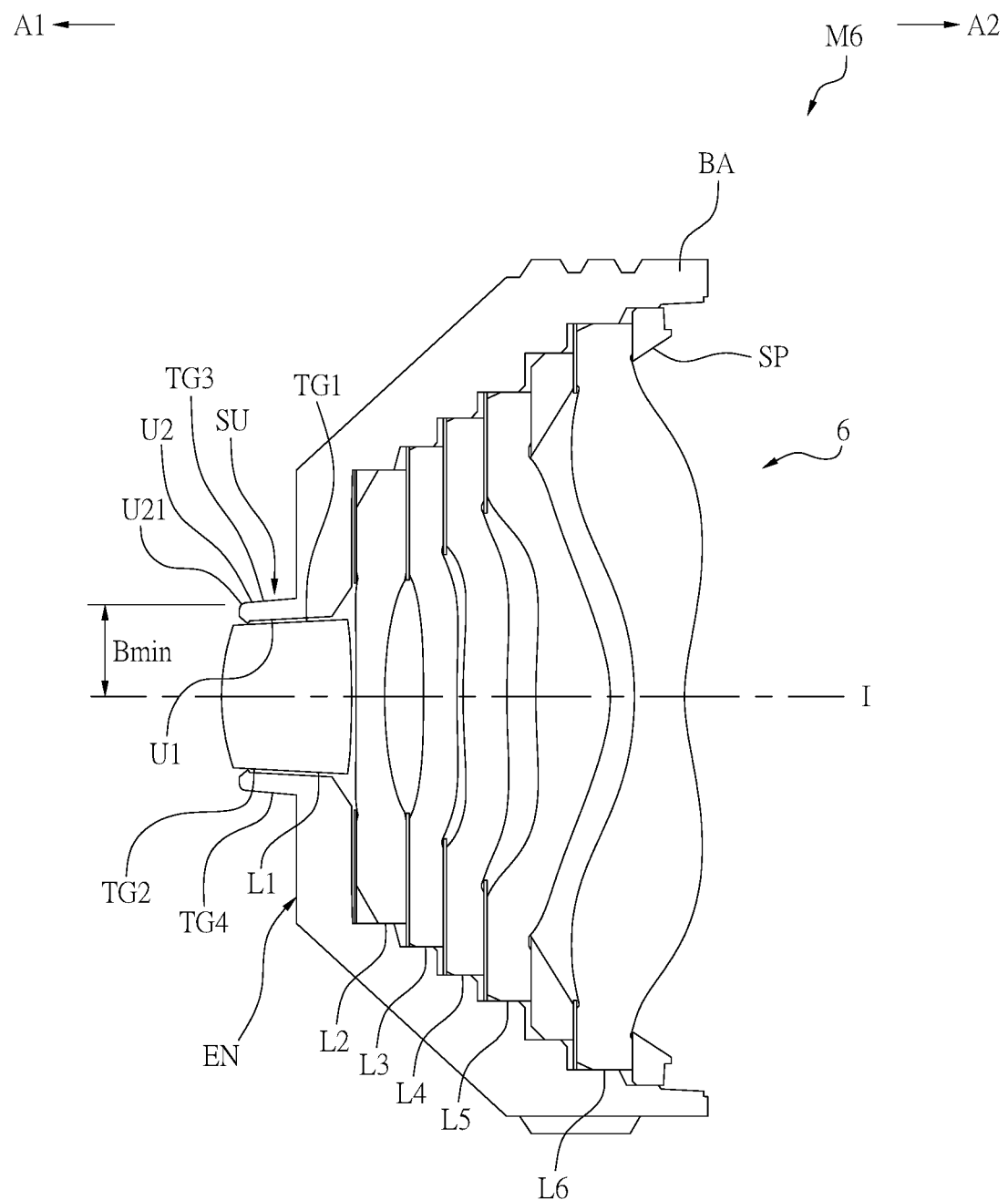
FIG. 11A depicts a cross-sectional view of the optical imaging lens module according to the sixth embodiment of the present disclosure.
Figure 11B:
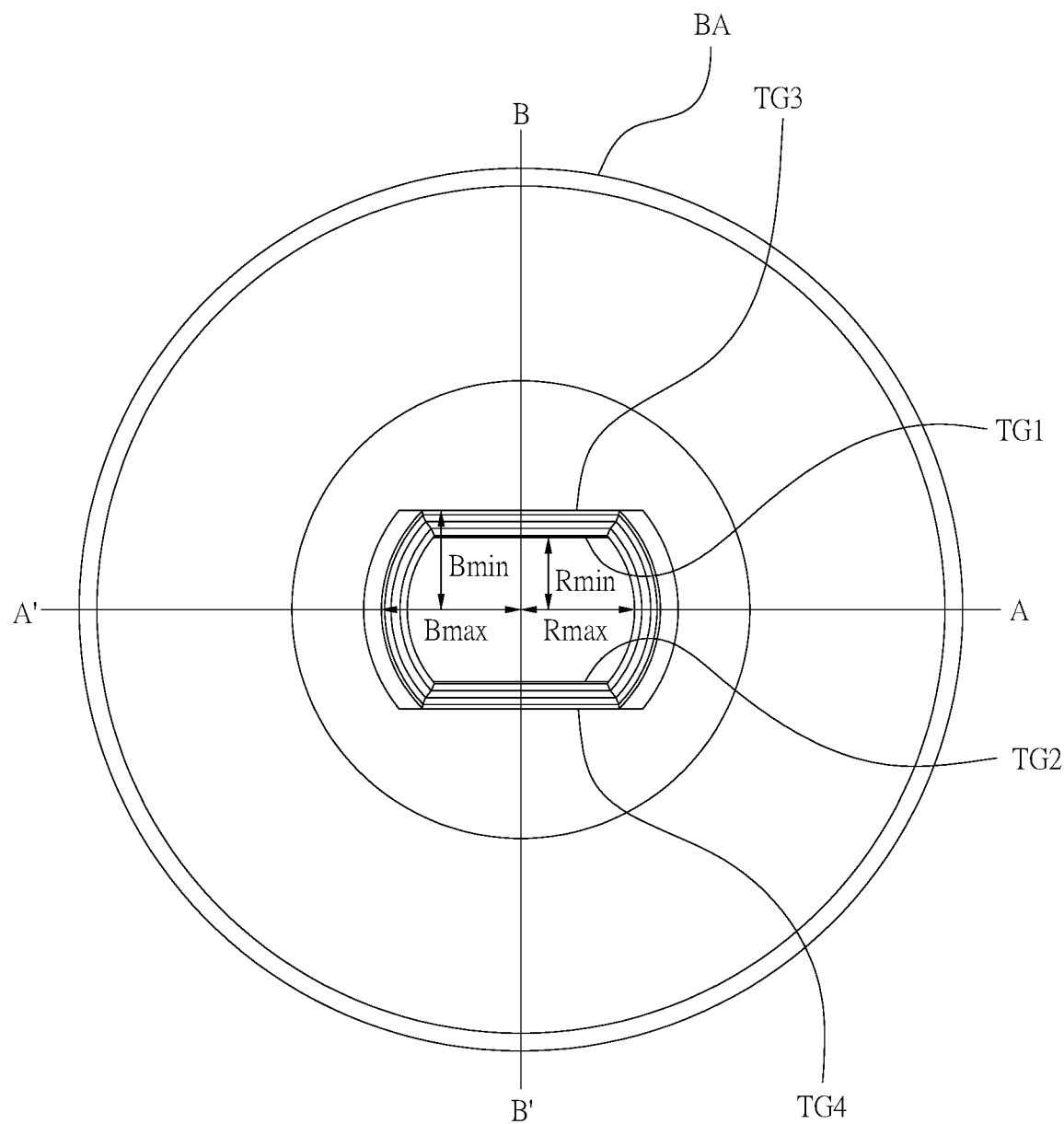
FIG. 11B depicts a front view of the optical imaging lens module according to the sixth embodiment of the present disclosure.

As shown in FIGS. 11A and 11B. FIG. 11A illustrates a cross-sectional view of the optical imaging lens module M6 according to the sixth embodiment of the present disclosure. FIG. 11B illustrates a front view of the optical imaging lens module M6 according to the sixth embodiment of the present disclosure. The optical imaging lens module M6 may be generally similar to the optical imaging lens module M4. The optical imaging lens module M6 may comprise a lens barrel BA and an optical imaging lens 6. The differences between the optical imaging lens module M4 and the optical imaging lens module M6 may include that the extension surface EX of the first lens element L1 of the optical imaging lens module M6 may further comprise a first cutting plane TG1 and a second cutting plane TG2, and the surrounding portion SU of the lens barrel BA may further comprise a third cutting plane TG3 and a fourth cutting plane TG4. The third cutting plane TG3 may be corresponding to the first cutting plane TG1. The fourth cutting plane TG4 may be corresponding to the second cutting plane TG2. The second cutting plane TG2 may be opposite to the first cutting plane TG1. The third cutting plane TG3 may be opposite to the fourth cutting plane TG4.

Since the surrounding portion SU of the sixth embodiment has the third cutting plane TG3 and the fourth cutting plane TG4, the distance from the front end U21 near the object side A1 of the outer annular surface U2 of the surrounding portion SU to the optical axis I may be distributed in a range between a minimum Bmin and a maximum Bmax. In this embodiment, Bmin is about 0.705 mm, and Bmax is about 1.025 mm. In order to indicate the positions of the third cutting plane TG3 and the fourth cutting plane TG4 on the surrounding portion SU, the optical imaging lens module M6 may satisfy an inequality: $Bmin/Bmax \leq 0.900$.

In order to indicate the positions of the first cutting plane TG1 and the second cutting plane TG2 on the first lens element L1, the optical imaging lens module M6 may satisfy an inequality: $Rmin/Rmax \leq 0.900$.

Figure 12:
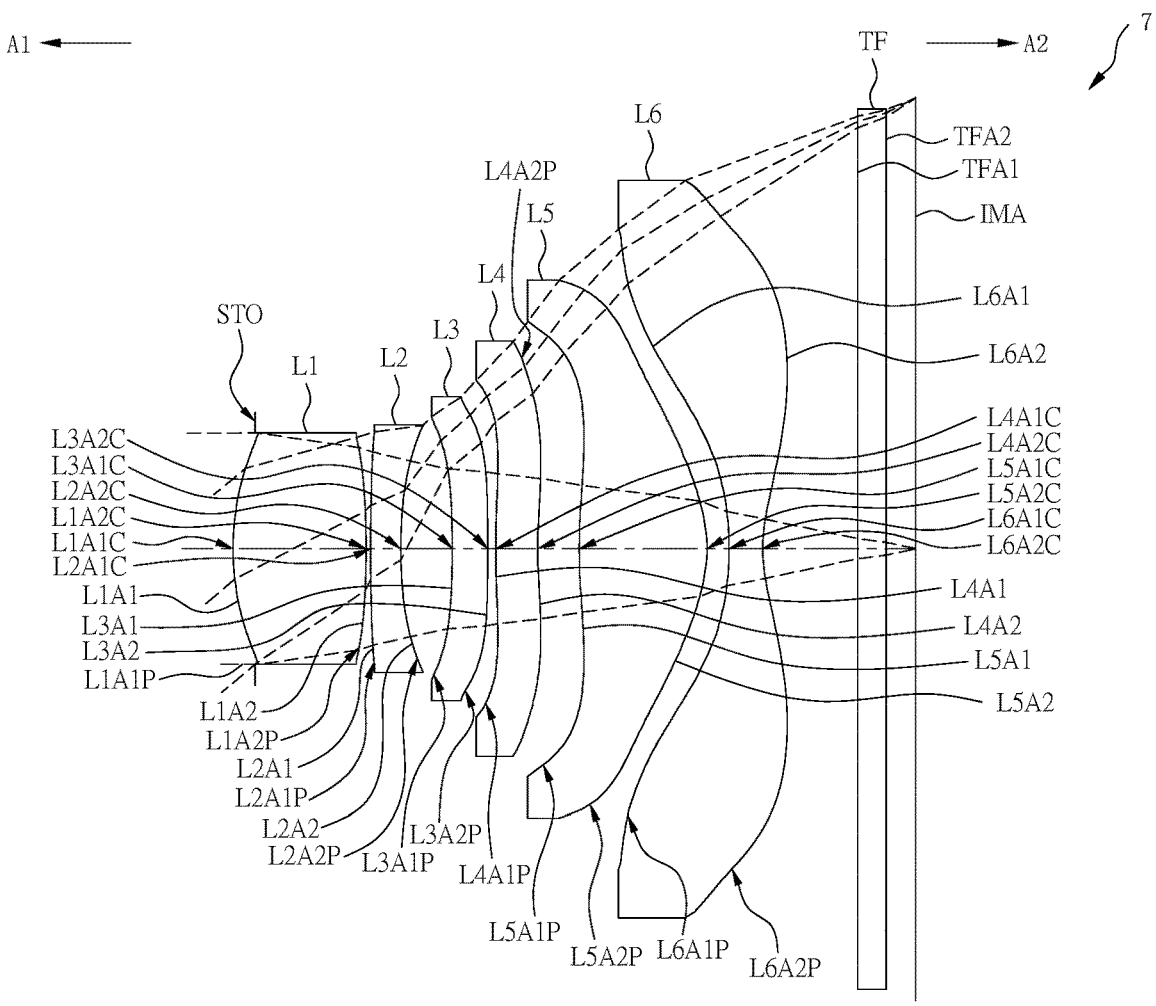
FIG. 12 depicts a cross-sectional view of the optical imaging lens module according to the seventh embodiment of the present disclosure.
Figure 13:
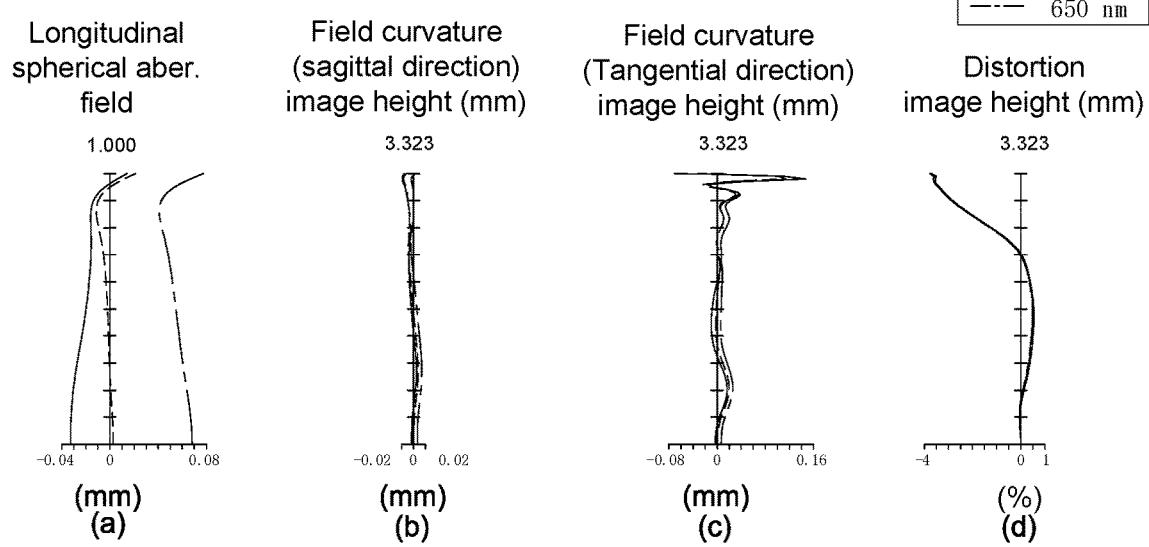
FIG. 13 depicts a chart of a longitudinal spherical aberration and other kinds of optical aberrations the optical imaging lens according to the seventh embodiment of the present disclosure.

In order to specify the optical imaging lenses 1-6, please refer to FIGS. 12-15. FIG. 12 illustrates an example cross-sectional view of an optical imaging lens 7 according to a seventh example embodiment. FIG. 13 shows example charts of a longitudinal spherical aberration and other kinds of optical aberrations of the optical imaging lens 7 according to the seventh example embodiment. FIG. 14 illustrates an example table of optical data of each lens element of the optical imaging lens 7 according to the seventh example embodiment. FIG. 15 depicts an example table of aspherical data of the optical imaging lens 7 according to the seventh example embodiment. The optical imaging lens 7 can replace the above mentioned optical imaging lens 1-6.

As shown in FIG. 12, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, and a sixth lens element L6. A filtering unit TF and an image plane IMA of an image sensor (not shown) may be positioned at the image side A2 of the optical imaging lens 7.

Each of the first, second, third, fourth, and fifth lens elements L1, L2, L3, L4, L5, L6 and the filtering unit TF may comprise an object-side surface L1A1/L2A1/L3A1/L4A1/L5A1/L6A1/TFA1 facing toward the object side A1 and an image-side surface L1A2/L2A2/L3A2/L4A2/L5A2/L6A2/TFA2 facing toward the image side A2. The example embodiment of the illustrated filtering unit TF may be positioned between the sixth lens element L6 and the image plane IMA. The filtering unit TF may be a filter for preventing light with certain wavelength from reaching the mage plane IMA and affecting imaging quality.

In this embodiment, each lens element of the optical imaging lens 1 will now be described with reference to the drawings. The lens elements L1, L2, L3, L4, L5, and L6 of the optical imaging lens 7 may be constructed using plastic materials in this embodiment, which can reduce the weight of the lens elements and save costs, but not limited to this.

In the seventh embodiment, an example embodiment of the first lens element L1 may have positive refracting power. Both of the optical axis region L1A1C and the periphery region L1A1P of the object-side surface L1A1 of the first lens element L1 may be convex. Both of the optical axis region L1A2C and the periphery region L1A2P of the image-side surface L1A2 of the first lens element L1 may be convex.

An example embodiment of the second lens element L2 may have negative refracting power. Both of the optical axis region L2A1C and the periphery region L2A1P of the object-side surface L2A1 of the second lens element L2 may be convex. Both of the optical axis region L2A2C and the periphery region L2A2P of the image-side surface L2A2 of the second lens element L2 may be concave.

An example embodiment of the third lens element L3 may have negative refracting power. Both of the optical axis region L3A1C and the periphery region L3A1P of the object-side surface L3A1 of the third lens element L3 may be concave. Both of the optical axis region L3A2C and the periphery region L3A2P of the image-side surface L3A2 of the third lens element L3 may be convex.

An example embodiment of the fourth lens element L4 may have negative refracting power. The optical axis region L4A1C of the object-side surface L4A1 of the fourth lens element L4 may be convex. The periphery region L4A1P of the object-side surface L4A1 of the fourth lens element L4 may be concave. The optical axis region L4A2C of the image-side surface L4A2 of the fourth lens element L4 may be concave. The periphery region L4A2P of the image-side surface L4A2 of the fourth lens element L4 may be convex.

An example embodiment of the fifth lens element L5 may have positive refracting power. The optical axis region L5A1C of the object-side surface L5A1 of the fifth lens element L5 may be convex. The periphery region L5A1P of the object-side surface L5A1 of the fifth lens element L5 may be concave. Both of the optical axis region L5A2C and the periphery region L5A2P of the image-side surface L5A2 of the fifth lens element L5 may be convex.

An example embodiment of the sixth lens element L6 may have negative refracting power. Both of the optical axis region L6A1C and the periphery region L6A1P of the object-side surface L6A1 of the sixth lens element L6 may be concave. The optical axis region L6A2C of the image-side surface L6A2 of the sixth lens element L6 may be concave. The periphery region L6A2P of the image-side surface L6A2 of the sixth lens element L6 may be convex.

The total twelve aspherical surfaces including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, and the object-side surface L6A1 and the image-side surface L6A2 of the sixth lens element L6 may all be defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 15.

FIG. 13(a) shows a longitudinal spherical aberration for three representative wavelengths (470 nm, 555 nm and 650 nm), wherein the vertical axis of FIG. 13(a) defines the field of view. FIG. 13(b) shows the field curvature aberration in the sagittal direction for three representative wavelengths (470 nm, 555 nm and 650 nm), wherein the vertical axis of FIG. 13(b) defines the image height. FIG. 13(c) shows the field curvature aberration in the tangential direction for three representative wavelengths (470 nm, 555 nm and 650 nm), wherein the vertical axis of FIG. 13(c) defines the image height. FIG. 13(d) shows a variation of the distortion aberration, wherein the vertical axis of FIG. 13(d) defines the image height. The three curves with different wavelengths (470 nm, 555 nm and 650 nm) may represent that off-axis light with respect to these wavelengths may be focused around an image point. From the vertical deviation of each curve shown in FIG. 13(a), the offset of the off-axis light relative to the image point may be within ±0.08 mm. Therefore, the first embodiment may improve the longitudinal spherical aberration with respect to different wavelengths. Referring to FIG. 13(b), the focus variation with respect to the three different wavelengths (470 nm, 555 nm and 650 nm) in the whole field may fall within ±0.02 mm. Referring to FIG. 13(c), the focus variation with respect to the three different wavelengths (470 nm, 555 nm and 650 nm) in the whole field may fall within ±0.16 mm. Referring to FIG. 13(d), and more specifically the horizontal axis of FIG. 13(d), the variation of the distortion aberration may be within ±4%.

As shown in FIG. 14, the distance from the object-side surface L1A1 of the first lens element L1 to the image plane IMA along the optical axis (TTL), the system length, may be about 5.030 mm, F-number (Fno) may be about 2.373, the half field of view (HFOV) may be about 40.051 degrees, the effective focal length (EFL) of the optical imaging lens 7 may be about 4.045 mm, and the image height of the optical imaging lens 7 (ImgH) may be about 3.323 mm. In accordance with these values, the optical imaging lens 7 provided in the present embodiment may reduce the area ratio of optical imaging lens module to the screen while improving assembly yield.

Please refer to FIG. 20 for the values of T1, G12, T2, G23, T3, G34, T4, G45, T5, G56, T6, G6F, TTF, GFP, BFL, EFL, TL, TTL, ALT, AAG, TTL/T1, and Tmax/TTmax of the present embodiment.

Figure 16:
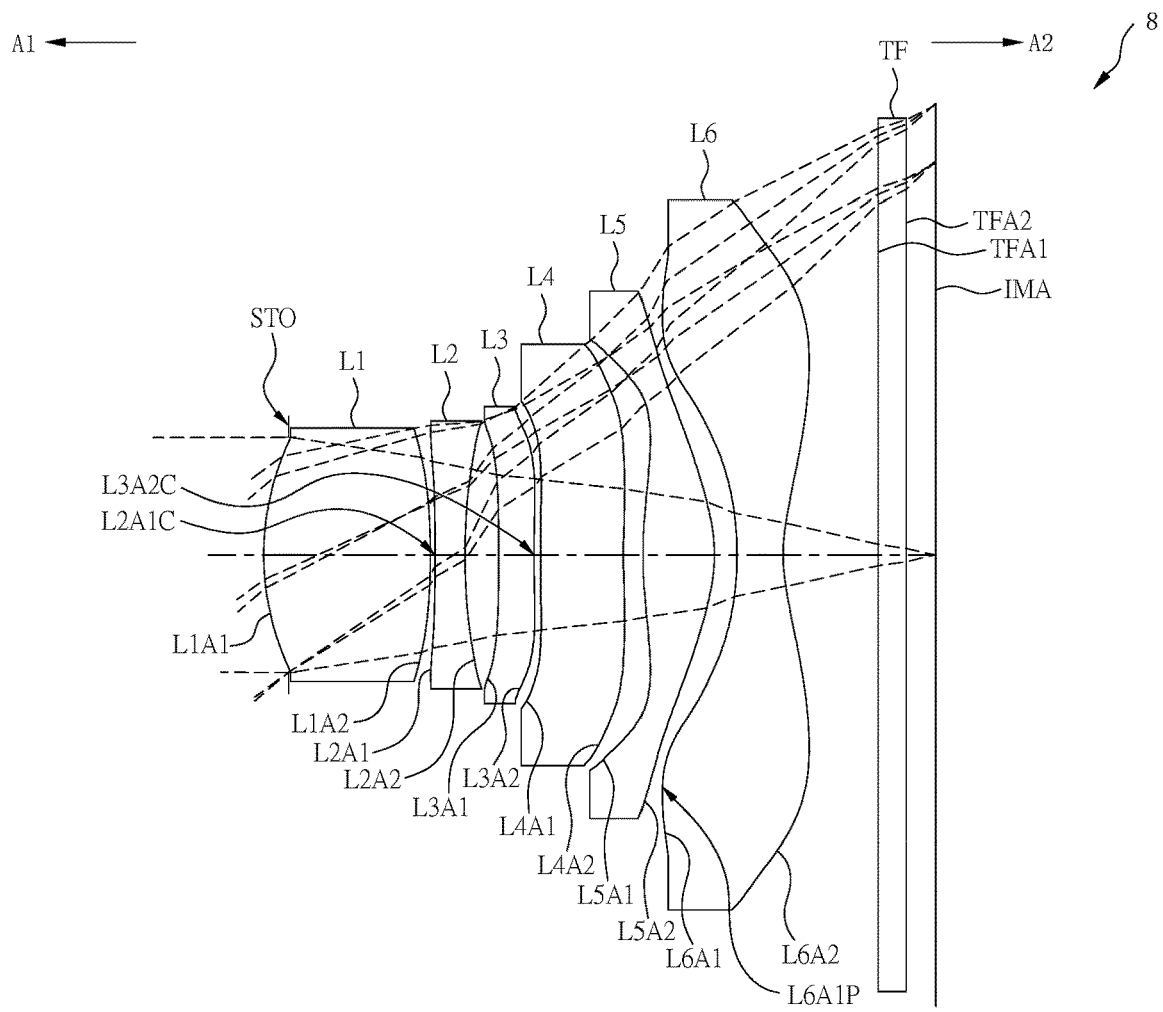
FIG. 16 depicts a cross-sectional view of the optical imaging lens module according to the eighth embodiment of the present disclosure.
Figure 17:
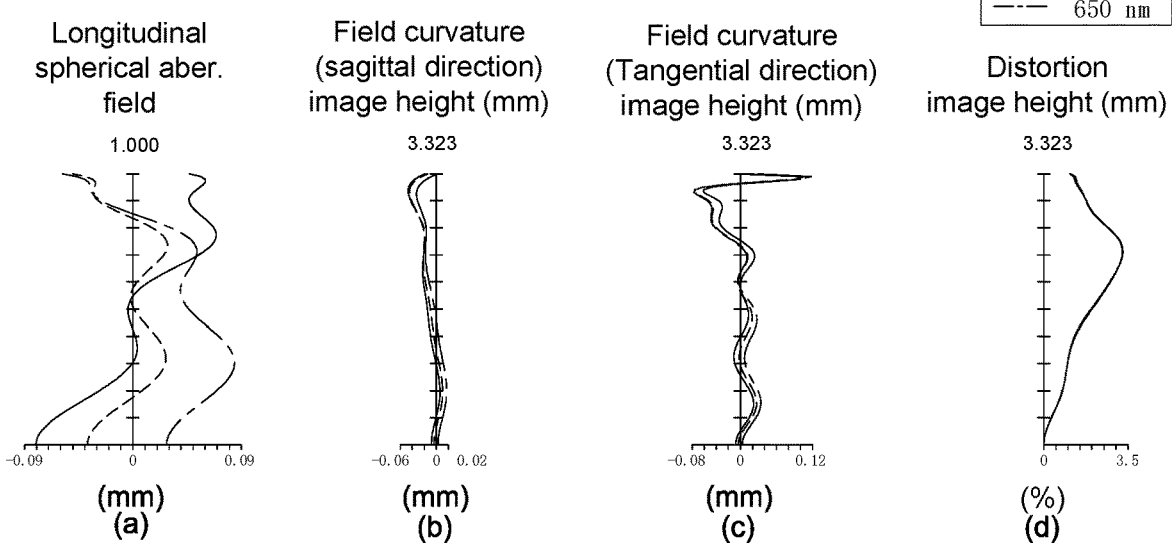
FIG. 17 depicts a chart of a longitudinal spherical aberration and other kinds of optical aberrations the optical imaging lens according to the eighth embodiment of the present disclosure.

Reference is now made to FIGS. 16-19. FIG. 16 illustrates an example cross-sectional view of an optical imaging lens 8 according to an eighth example embodiment. FIG. 17 shows example charts of a longitudinal spherical aberration and other kinds of optical aberrations of the optical imaging lens 8 according to the eighth example embodiment. FIG. 18 shows an example table of optical data of each lens element of the optical imaging lens 8 according to the eighth example embodiment. FIG. 19 shows an example table of aspherical data of the optical imaging lens 8 according to the eighth example embodiment. The optical imaging lens 8 can replace the above mentioned optical imaging lens 1-6.

As shown in FIG. 16, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, and a sixth lens element L6.

The arrangement of the convex or concave surface structures, including the object-side surfaces L1A1, L3A1, L4A1, L5A1 and the image-side surfaces L1A2, L2A2, L4A2, L5A2, L6A2, of the optical imaging lens 8 may be generally similar to the optical imaging lens 7, but the differences between the optical imaging lens 8 and the optical imaging lens 7 may include the concave or convex surface structures of the object-side surfaces L2A1, L6A1, the image-side surface L3A2, a radius of curvature, a thickness, aspherical data, and/or an effective focal length of each lens element. More specifically, the optical axis region L2A1C of the object-side surface L2A1 of the second lens element L2 may be concave, the optical axis region L3A2C of the image-side surface L3A of the third lens element L3 may be concave, and the periphery region L6A1P of the object-side surface L6A1 of the sixth lens element L6 may be convex in the eighth embodiment.

Here, in the interest of clearly showing the drawings of the present embodiment, only the surface shapes which are different from that in the seventh embodiment may be labeled. Please refer to FIG. 18 for the optical characteristics of each lens element in the optical imaging lens 8 of the present embodiment.

From the vertical deviation of each curve shown in FIG. 17(a), the offset of the off-axis light relative to the image point may be within ±0.09 mm. Referring to FIG. 17(b), the focus variation with respect to the three different wavelengths (470 nm, 555 nm and 650 nm) in the whole field may fall within ±0.06 mm. Referring to FIG. 17(c), the focus variation with respect to the three different wavelengths (470 nm, 555 nm and 650 nm) in the whole field may fall within ±0.12 mm. Referring to FIG. 17(d), the variation of the distortion aberration of the optical imaging lens 8 may be within ±3.5%.

In comparison with the seventh embodiment, the field curvature aberration in the tangential direction, the distortion aberration and the F-number may be smaller, and the system length may be shorter in the eighth embodiment as shown in FIG. 17 and FIG. 18.

Please refer to FIG. 20 for the values of T1, G12, T2, G23, T3, G34, T4, G45, T5, G56, T6, G6F, TTF, GFP, BFL, EFL, TL, TTL, ALT, AAG, TTL/T1, and Tmax/TTmax of the present embodiment.

According to above disclosure, the longitudinal spherical aberration, the field curvature aberration and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the 470 nm, 555 nm and 650 nm wavelengths may indicate that focusing ability and inhibiting ability for dispersion may be provided for different wavelengths.

In consideration of the non-predictability of design for the optical system, while the optical imaging lens module may satisfy any one of inequalities described above, the optical imaging lens module according to the disclosure herein may achieve a reduced area ratio of optical imaging lens module to the screen, a shortened system length of the optical imaging lens, and an increased field of view of the optical imaging lens, improve an imaging quality or assembly yield, and effectively improve drawbacks of a typical optical imaging lens.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens module, comprising:
   a lens barrel; and
   an optical imaging lens, comprising a plurality of lens elements engaged with the lens barrel sequentially from an object side to an image side along an optical axis, wherein a lens element closest to the object side in the plurality of lens elements is a first lens element, the first lens element comprises an optical effective portion and an optical ineffective portion surrounding the optical effective portion, the optical effective portion has an object-side surface facing toward the object side and allowing imaging rays to pass through as well as an image-side surface facing toward the image side and allowing the imaging rays to pass through, and a border around the object-side surface has an extension surface extending from the object side toward the image side;
   wherein an angle between the extension surface of the first lens element and the optical axis is represented by ω;
   the optical imaging lens module satisfies an inequality: 1.000 degrees≤ω≤5.000 degrees; and
   wherein the lens barrel further comprises a surrounding portion, and the surrounding portion surrounds the extension surface and has an inner annular surface and an outer annular surface, the inner annular surface and the outer annular surface are parallel to the extension surface, a minimum distance from the front end near the object side of the outer annular surface to the optical axis is represented by Bmin, a thickness of the first lens element along the optical axis is represented by T1, and the optical imaging lens module further satisfies an inequality: Bmin/T1≤1.300.

2. The optical imaging lens module according to claim 1, wherein a minimum vertical distance from an intersection of the object-side surface of the first lens element and the extension surface to the optical axis is represented by Rmin, and the optical imaging lens module further satisfies an inequality: Rmin/T1≤1.300.

3. The optical imaging lens module according to claim 1, wherein the extension surface is coated with an opaque coating.

4. The optical imaging lens module according to claim 3, wherein a surface of the optical ineffective portion is coated with an opaque coating.

5. The optical imaging lens module according to claim 4, wherein a surface roughness of the extension surface or the surface of the optical ineffective portion is represented by Ra, and the optical imaging lens module further satisfies an inequality: Ra≥0.200 μm.

6. The optical imaging lens module according to claim 1, wherein a distance from the object-side surface of the first lens element to an image plane along the optical axis is represented by TTL, and the optical imaging lens module further satisfies an inequality: TTL/T1≤8.000.

7. The optical imaging lens module according to claim 1, wherein the thickness of the first lens element along the optical axis is the thickest of the plurality of lens elements.

8. The optical imaging lens module according to claim 1, wherein a minimum vertical distance from an intersection of the object-side surface of the first lens element and the extension surface to the optical axis is represented by Rmin, a maximum vertical distance from an intersection of the object-side surface of the first lens element and the extension surface to the optical axis is represented by Rmax, and the optical imaging lens module further satisfies an inequality: Rmin/Rmax≤0.900.

9. The optical imaging lens module according to claim 8, wherein the optical imaging lens module further satisfies an inequality: 0.600≤Rmin/Rmax≤0.900.

10. The optical imaging lens module according to claim 1, wherein a maximum distance from the front end near the object side of the outer annular surface to the optical axis is represented by Bmax, and the optical imaging lens module further satisfies an inequality: Bmin/Bmax≤0.900.

11. The optical imaging lens module according to claim 10, wherein the optical imaging lens module further satisfies an inequality: 0.650≤Bmin/Bmax≤0.900.

12. The optical imaging lens module according to claim 1, wherein a distance from the surface of the lens barrel closest to the object side to the image-side surface of the first lens element along the optical axis is represented by S1, and the optical imaging lens module further satisfies an inequality: 0.950<S1/T1≤1.050.

13. The optical imaging lens module according to claim 1, wherein a maximum thickness of the plurality of lens elements along the optical axis is represented by Tmax, a second largest thickness of the plurality of lens elements along the optical axis is represented by TTmax, and the optical imaging lens module further satisfies an inequality: Tmax/TTmax≥1.040.

14. The optical imaging lens module according to claim 1, wherein the lens barrel further comprises an engaging portion, the engaging portion is engaged with the optical ineffective portion, and the surrounding portion surrounds the extension surface and is connected with the engaging portion.

15. An optical imaging lens module, comprising:
a lens barrel; and
an optical imaging lens, comprising a plurality of lens elements engaged with the lens barrel sequentially from an object side to an image side along an optical axis, wherein a lens element closest to the object side in the plurality of lens elements is a first lens element, the first lens element comprises an optical effective portion and an optical ineffective portion surrounding the optical effective portion, the optical effective portion has an object-side surface facing toward the object side and allowing imaging rays to pass through as well as an image-side surface facing toward the image side and allowing the imaging rays to pass through, a border around the object-side surface has an extension surface extending from the object side toward the image side, and the lens barrel has an engaging portion disposed between the object side and the optical ineffective portion of the first lens element and engaged with the optical ineffective portion;
wherein a distance from the surface of the lens barrel closest to the object side to the image-side surface of the first lens element along the optical axis is represented by S1, and a thickness of the first lens element along the optical axis is represented by T1;
the optical imaging lens module satisfies an inequality: S1/T1≤0.950; and
wherein the lens barrel further comprises a surrounding portion, and the surrounding portion has an inner annular surface and an outer annular surface, the inner annular surface and the outer annular surface are parallel to the extension surface, a minimum distance from the front end near the object side of the outer annular surface to the optical axis is represented by Bmin, and the optical imaging lens module further satisfies an inequality: Bmin/T1≤1.300.

16. The optical imaging lens module according to claim 15, wherein a minimum vertical distance from an intersection of the object-side surface of the first lens element and the extension surface to the optical axis is represented by Rmin, and the optical imaging lens module further satisfies an inequality: Rmin/T1≤1.300.

17. The optical imaging lens module according to claim 15, wherein a distance from the object-side surface of the first lens element to an image plane along the optical axis is represented by TTL, and the optical imaging lens module further satisfies an inequality: TTL/T1≤8.000.

18. The optical imaging lens module according to claim 15, wherein the surrounding portion surrounding the extension surface and connected with the engaging portion.

* * * * *